(12) United States Patent
Tompkin et al.

(10) Patent No.: US 10,112,430 B2
(45) Date of Patent: Oct. 30, 2018

(54) SECURITY ELEMENT AND SECURITY DOCUMENT

(71) Applicant: OVD Kinegram AG, Zug (CH)

(72) Inventors: Wayne Robert Tompkin, Baden (CH); Harald Walter, Horgen (CH); Sebastian Mader, Luzern (CH)

(73) Assignee: OVD KINEGRAM AG, Zug (CH)

( * ) Notice: Subject to any disclaimer, the term of this patent is extended or adjusted under 35 U.S.C. 154(b) by 565 days.

(21) Appl. No.: 14/424,678

(22) PCT Filed: Sep. 3, 2013

(86) PCT No.: PCT/EP2013/068193
§ 371 (c)(1),
(2) Date: Feb. 27, 2015

(87) PCT Pub. No.: WO2014/033324
PCT Pub. Date: Mar. 6, 2014

(65) Prior Publication Data
US 2015/0224809 A1     Aug. 13, 2015

(30) Foreign Application Priority Data

Sep. 3, 2012  (DE) .................. 10 2012 108 169

(51) Int. Cl.
*B42D 25/29*   (2014.01)
*B42D 25/328*  (2014.01)
*B42D 25/00*   (2014.01)
*G02B 5/18*    (2006.01)

(52) U.S. Cl.
CPC ............. *B42D 25/29* (2014.10); *B42D 25/00* (2014.10); *B42D 25/328* (2014.10); *G02B 5/1866* (2013.01); *B42D 2035/36* (2013.01)

(58) Field of Classification Search
CPC ...... B42D 25/29; B42D 25/328; B42D 25/00; B42D 2035/36; G02B 5/1866
USPC ..... 283/67, 70, 72, 87, 91, 92, 94, 901, 902
See application file for complete search history.

(56) References Cited

U.S. PATENT DOCUMENTS

| 4,304,809 A | 12/1981 | Moraw et al. |
|---|---|---|
| 2005/0151368 A1 | 7/2005 | Heim |
| 2008/0106091 A1 | 5/2008 | Tompkin et al. |
| 2009/0244519 A1* | 10/2009 | Whiteman ............ B42D 25/29 356/71 |
| 2010/0165425 A1 | 7/2010 | Tompkin et al. |

(Continued)

FOREIGN PATENT DOCUMENTS

| AU | 649625 | 4/1991 |
|---|---|---|
| AU | 635255 | 10/1991 |

(Continued)

OTHER PUBLICATIONS

"Optical Document Security" by Rudolf van Renesse, Diffraction-Based Security Features (Third Edition), pp. 196-201 and pp. 212-217 (2005).

*Primary Examiner* — Justin V Lewis
(74) *Attorney, Agent, or Firm* — Hoffmann & Baron, LLP

(57) ABSTRACT

The invention relates to a security element (2) with a first area (30) that is transparent in transmitted light. The security element (2) has a substrate (21) which has, in the first area (30), one or more transmissive diffraction structures which display one or more optical security features when observed in transmitted light.

36 Claims, 24 Drawing Sheets

(56) References Cited

U.S. PATENT DOCUMENTS

| | | |
|---|---|---|
| 2010/0315714 A1 | 12/2010 | Tompkin et al. |
| 2011/0128600 A1 | 6/2011 | Tompkin et al. |
| 2012/0187674 A1 | 7/2012 | Zahedi |

FOREIGN PATENT DOCUMENTS

| | | |
|---|---|---|
| AU | 681909 | 5/1995 |
| AU | 2005229477 | 10/2005 |
| AU | 2012238590 | 10/2012 |
| DE | 102004044459 | 3/2006 |
| DE | 102007023560 | 11/2008 |
| DE | 102008024147 | 11/2009 |
| DE | 102009048870 | 2/2011 |
| EP | 0075674 | 12/1985 |
| WO | WO0100418 | 1/2001 |
| WO | WO0102192 | 1/2001 |
| WO | WO02091041 | 11/2002 |
| WO | WO03070482 | 8/2003 |
| WO | WO2007079548 | 7/2007 |
| WO | WO2008003949 | 1/2008 |

\* cited by examiner

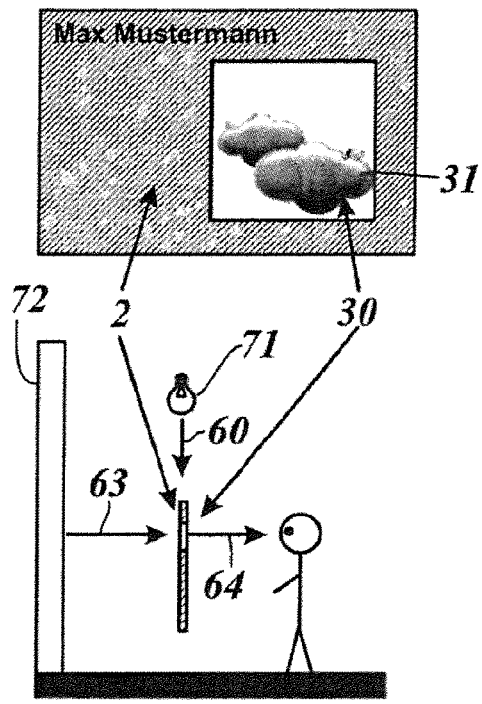 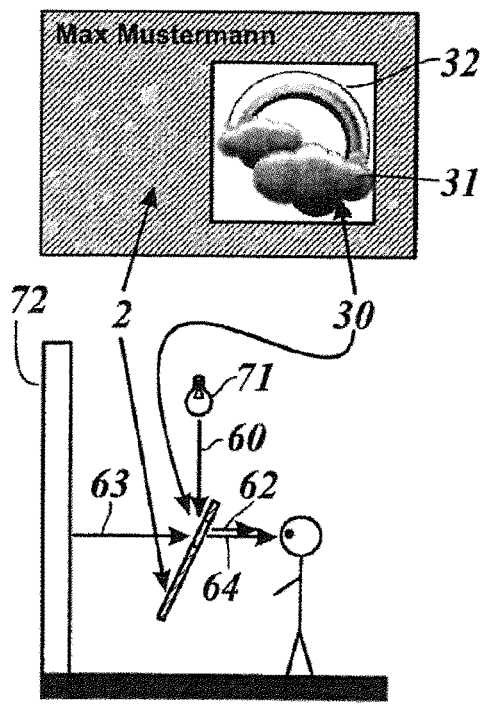
*Fig. 9a*  *Fig. 9b*
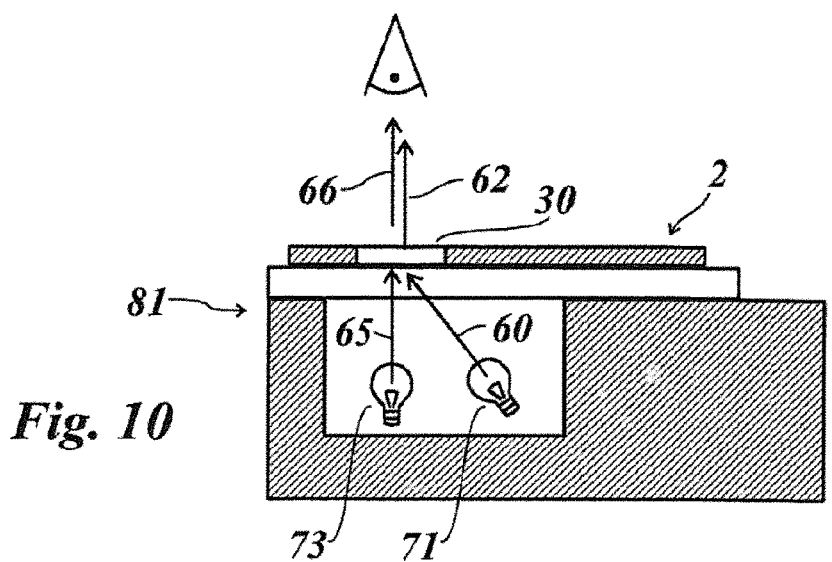
*Fig. 10*

ID-Karte = ID card

SECURITY ELEMENT AND SECURITY DOCUMENT

This application claims priority based on an International Application filed under the Patent Cooperation Treaty, PCT/EP2013/068193, filed on Sep. 3, 2013, and German Application No. DE 102012108169.7, filed on Sep. 3, 2012.

BACKGROUND OF THE INVENTION

The invention relates to a security element and a security document with a security element.

It is known to equip banknotes with watermarks or security threads. These security elements provide a security feature which is recognizable in transmitted light. For inspection of these security features, the banknote is arranged between a light source, for example an artificial light source such as a neon tube or an incandescent light bulb or a natural light source such as for example the sun, and the observer and the appearance of the banknote is inspected in such a transmitted light observation. With this manner of observation, the light transmitted through the banknote is weakened differently in different areas of the banknote by the change in the transmissivity of the security document in the area covered with the watermark or security thread, with the result that a corresponding contrast becomes recognizable to the human observer as a security feature. The object of the invention is now to specify a security element or security document with an increased level of protection against forgery.

SUMMARY OF THE INVENTION

This object is achieved by a security element which has a first area that is transparent in transmitted light, wherein the security element has a substrate which has, in the first area, one or more transmissive diffraction structures which display one or more optical security features when observed in transmitted light. This object is further achieved by a security document with such a security element.

By an area that is transparent in transmitted light is meant here an area which, at least at one tilt angle, has a transmissivity for at least one wavelength range of at least 30 nm from the wavelength range of from 460 nm to 660 nm of more than 20%, in particular more than 50%. At least at one tilt angle, the transmissivity is preferably more than 50% in the wavelength range of from 460 nm to 660 nm and further preferably more than 80% in at least half of the wavelength range of from 460 nm to 660 nm.

As transmissive diffraction structures here, diffraction structures are preferably used which are designed to achieve a diffraction effect in transmission such that the partial areas, of the first area, covered with them in each case display, as optical security feature, a color-change effect that is recognizable to the human observer when observed in transmitted light against a light source directionally radiating white light, when the security element is tilted and/or turned. When the security element is observed in transmitted light, the security element thus displays a change for example between a white or colorless transparent appearance and for example a red-colored or blue-colored appearance in the partial area when tilted and/or turned. Alternatively, the color-change effect can also take place in reverse order, i.e. the security element displays a change for example between a red-colored or blue-colored appearance and a white or colorless transparent appearance in the partial area when tilted and/or turned. A further alternative is a color-change effect from for example red-colored to blue-colored. In the latter case, the security feature has a colored appearance at all observation and/or turn angles. The security feature generated in this way clearly differs from the appearance of the above-described known transparent security features and provides a striking security feature.

It is further advantageous if, in the first area, two or more different transmissive diffraction structures are arranged which display an optical security feature when observed in transmitted light. These different transmissive diffraction structures are here preferably designed such that, when observed in transmitted light against a light source radiating white light, they display different color-change effects when the security element is tilted and/or turned, in particular they differ in relation to the tilt angle and/or turn angle at which a color is generated, or in relation to the color value which is generated at a particular tilt angle and/or turn angle. Through the use of two or more different transmissive diffraction structures, a plurality of striking and surprising security features can be realized, as also described in the following. The tilting or turning can be combined as desired. For example, there is first a tilting about an angle and then a turning in this tilted plane or the turning takes place at several different tilt angles. For example, zero-order transmitted-light diffraction effects can also be combined with first-order or higher-order transmitted-light diffraction effects.

According to a preferred embodiment example of the invention, the first area has one or more first zones which are covered with a first of the transmissive diffraction structures, and one or more second zones which are covered with a second of the transmissive diffraction structures. The first transmissive diffraction structures differ here from the second transmissive diffraction structures. The first zone or the first zones here are covered with the first diffraction structure in each case preferably over the whole surface. The second zone or the second zones here are covered with the second transmissive diffraction structure in each case preferably over the whole surface.

Further, it is also possible for the first area to have, in addition to the one or more first and second zones, still further zones which are covered with others of the one or more transmissive diffraction structures which differ from the first and second diffraction structures. The first area thus preferably also has one or more third zones and/or one or more fourth zones, wherein the third zones are covered with a third one of the one or more transmissive diffraction structures or, respectively, the fourth zones are covered with a fourth one of the one or more transmissive diffraction structures. The first, second, third and optionally fourth diffraction structures here in each case mutually differ from each other.

The first and the second transmissive diffraction structures preferably differ from each other by one or more of their structure parameters and/or by their composition. It has proved worthwhile here for the first and second diffraction structures to differ from each other for example in their relief shape and/or their relief depth or grating depth and/or their azimuth angle and/or their grating period. By relief shape is meant here the shaping of the structure elements of which the transmissive diffraction structure is formed. Here, the first and second transmissive diffraction structures can have for example different symmetrical relief shapes, for example the first diffraction structure can have a sinusoidal relief shape and the second transmissive diffraction structure can have a rectangular relief shape. Further, it is also possible for the first diffraction structure to have an asymmetrical relief shape and for the second diffraction structure to have a symmetrical relief shape, or vice versa, or for the first or second diffraction structure to differ in relation to the asymmetry of the relief shape. The parameters which influence the color-change effect the most are preferably the grating period and the grating depth, as well as the azimuth angle.

Further, it is advantageous if the first and second transmissive diffraction structures are formed of different types of transmissive diffraction structures. By different types of transmissive diffraction structures here is meant diffraction structures which have a different layer composition and/or which are selected from different ones of the classes of transmissive diffraction structures described below, for example a combination of the first class of transmissive diffraction structures described below and the second or third class of transmissive diffraction structures described below.

Further, it is advantageous if the first and the second transmissive diffraction structures differ in the effect that is recognizable to the human observer when observed in transmitted light, and differ in particular in one or more of the following parameters: difference in the color spectrum of the transmitted light in an untilted and/or unturned state, difference in the color spectrum of the transmitted light in a tilted and/or rotated state, tilt angle or tilt angle range, rotation angle or rotation angle range in which the color spectrum is changed, transmissivity in an untilted and/or rotated state, transmissivity in a tilted and/or rotated state, alignment of the tilt axis and/or axis of rotation to achieve these effects.

The one or more first and one or more second zones here can be arranged spaced apart from each other or next to each other in the first area of the security element.

With respect to the arrangement of the first area, the partial areas of the first area and the zones, an observation of the security element in top view is taken as the starting point here.

It has proved worthwhile for neighboring first and second zones to be spaced apart from each other by less than 20 µm, preferably less than 5 µm, particularly preferably less than 2 µm.

According to a preferred embodiment example of the invention the first and second zones in each case have lateral dimensions of more than 300 µm. The first and the second zones preferably have a width and a length of, in each case, more than 500 µm, preferably of more than 1 mm. In this embodiment the first and second zones thus preferably have lateral dimensions in which the shaping of the first and second zones can be resolved by the human observer at a normal observation distance.

By lateral dimension is meant here the dimensions in a top view of the security element, i.e. the dimensions in the plane spanned by the top side or bottom side of the security element. By lateral dimension is thus meant in particular the width and the length of the zones.

The one or more first zones are preferably molded to form a first motif and the one or more second zones to form a second motif. By motif is meant here, among other things, also letters and numbers, a sequence of letters and numbers, logos, emblems, symbols, figurative representations, for example the portrait of a person, symbols or the like. The motifs can be composed of individual image elements such as dots, lines, mosaics, grids, surfaces, grayscale patterns or combinations thereof.

Through such a design it is thus possible for example to provide a transmissive security feature which displays for example the first motif in a first tilt angle range and the second motif in a second tilt angle range different from this, or displays the first and second motifs in different colors. The security feature can display the first motif and the second motif or also a third motif also at different rotation angles.

Further, it is advantageous if the one or more first and second zones are molded to form one motif, wherein the first zones form a foreground area of the motif and the second zones form a background area of the motif. At least one or more of the first zones here are preferably completely surrounded by one of the second zones. Through such a design for example transmissive security features can be provided in which the motif only appears in a particular tilt angle range because of a contrasting color of foreground area and background area or the color of the foreground area or background area changes depending on the tilt angle.

According to a further preferred embodiment example of the invention a plurality of second zones are provided in the first area, wherein the first and second zones in each case have at least one lateral dimension of less than 300 µm, in particular less than 150 µm and preferably less than 80 µm. The first and second zones here can be formed for example in the form of pixels, for example in the shape of a square, an octagon or the like with a width and length dimension of less than 300 µm or can also be formed in the form of stripes, with a width of less than 300 µm and a length of more than 300 µm. The stripes can run in straight lines or also in waves or zigzags. The first and second zones here in each case preferably have a width of more than 5 µm, in particular 10 µm, further preferably of more than 20 µm. This minimum width makes it possible to reduce or suppress undesired diffraction effects from the zone boundaries. For example, such striped and neighboring zones differ in their azimuth angle by 0.1° to 10° and preferably 0.5° to 10°.

As already stated above, in addition to the first and second zones, in the first area, still further zones can be provided which are covered with a transmissive diffraction structure which differs from the first and second transmissive diffraction structures. The first area thus preferably has third and/or fourth zones which are covered with third or, respectively, fourth transmissive diffraction structures, wherein the third and fourth zones in each case also have at least one lateral dimension of less than 300 µm, in particular less than 150 µm, preferably less than 80 µm.

The use and the arrangement of such first, second, third and/or fourth zones make it possible to generate numerous optical security features which clearly improve the level of protection against forgery of the security element. In addition, the security element obtains a greater optical variability and/or can be perceived under a wider range of different observation and illumination conditions.

According to a preferred embodiment example of the invention, by means of such zones true-color images becoming visible when observed in transmitted light are generated which can change their color and their visibility further, among other things, when tilted and/or turned.

For this, the first area preferably has a motif area which is divided into a plurality of image point areas. Image point areas here can have not only a square, rhombic or octagonal shaping, but also a rectangular shaping. Here, at least two different zones selected from the group first and second zones, the group first, second and third zones, or the group first, second, third and fourth zones are arranged in at least a first of the image point areas. Thus, if for example three different zones are provided, the first image point area has for example one or more first and second zones, one or more second and third zones, or one or more first, second and third zones. Further, these zones are arranged in the first image point area such that the color appearing in the first image point area when observed in transmitted light at least at one tilt angle is generated by additive color mixing of the colors generated at this tilt angle by the transmissive diffraction structures arranged in this image point area in the different zones. For example, the three different zones can generate the colors red, green and blue (Red-Green-Blue=RGB) at one tilt angle.

The first image point area here preferably has at least one lateral dimension of less than 300 µm.

The brightness and the color value of the color generated, when observed in transmitted light in the first image point area, by the transmissive diffraction structures arranged there is determined here by the size of the surface area of the first, second and optionally third and fourth zones arranged in the first image point area, as well as the colors generated at this tilt angle by the first, second and optionally third and fourth transmissive diffraction structures. Corresponding choice of the size of the surface area of the first, second and optionally third and fourth zones in the first image point area thus makes it possible to set the color generated at the tilt angle and/or turn angle in transmitted light in the first image point area.

At least 10%, preferably at least 50% and further preferably at least 80% of the image point areas are preferably formed as first image point areas. One or more of the image point areas are further preferably formed as second image point areas in which, in each case, only one type of zones is provided, thus for example only one or more first zones or one or more second zones are provided.

According to a further preferred embodiment example of the invention a first motif area molded in the form of a first motif and a second motif area molded in the form of a second motif are provided in the first area. The first motif area and the second motif area overlap here at least in areas. Further, the first motif area is divided into a plurality of partial areas which in each case are covered with one or more first zones, and the second motif area is divided into a plurality of partial areas which in each case are covered with one or more second zones. The partial areas here preferably have at least one lateral dimension of less than 300 µm. In the overlap area of the first or second motif area, first and second zones are thus provided, in particular are provided neighboring each other, and in particular are arranged gridded in each other. Further, it is advantageous here if the first and second zones in each case are arranged according to a one- or two-dimensional grid and, in particular in the overlap area, areas of the grid which are assigned to first zones and areas of the grid which are assigned to second zones alternate. The grid width of the grid is preferably less than 300 µm in at least one direction.

This procedure makes it possible to provide a security feature which, when observed in transmitted light, displays the first motif in a first tilt angle range and/or first turn angle range and the second motif in a second tilt angle range and/or second turn angle range, and optionally a superimposed representation of the first and second motifs in a third tilt angle range and/or third turn angle range. The first area here preferably has not only a first motif area and a second motif area, but a plurality of motif areas which in each case are covered with different zones. Interesting optical effects, such as for example a simulation of a movement effect or a transformation effect, in which for example a first motif transitions via one or more intermediate steps into a second motif, can hereby be generated in transmitted light.

In this embodiment example, as already described above, the first zones and the second zones are preferably covered with different types of transmissive diffraction structures. As also stated in detail further below, for example the optical appearance of one of the motifs can hereby also be changed depending on the use of a polarizer and/or a color filter when observed in transmitted light, with the result that for example the first motif, but not the second motif changes when a polarizer and/or color filter is used. Suitable choice of the transmissive diffraction structures also makes it possible to produce a concealed feature ("hidden image") in which a motif only becomes recognizable through the use of a polarizer and/or color filter. An example of such a concealed feature is characterized by crossed transmissive diffraction structures in the first motif (e.g. a cross embedded in a square background) and linear transmissive diffraction structures in the second motif (e.g. the square background), wherein both transmissive diffraction structures e.g. produce an identical or very similar red color impression when observed without a polarizer and at a slightly tilted angle (e.g. $\alpha=20°$). Observed through a linear polarizer, the color impression of the second motif changes (e.g. from red to green), while the first motif remains almost unchanged. If the polarizer is rotated, the color impression of the second motif changes markedly, but the first motif does not change or hardly changes.

According to a preferred embodiment example of the invention one or more of the transmissive diffraction structures also used in particular as first, second, third or fourth transmissive diffraction structures are designed as described in the following:

At least one of the one or more transmissive diffraction structures brings about a change in the color of the partial area of the first area which is covered with this at least one transmissive diffraction structure when a first side of the security element facing an observer is observed in transmitted light against a light source which radiates white light parallel to a beam axis and is arranged on a second side of the security element opposite the first side of the security element, when the security element is tilted relative to the beam axis. The partial area here is preferably molded in particular in a pattern in the form of a motif. By a change in the color is meant here for example also a change of a partial area appearing transparent or colorless into a partial area appearing in a color, for example red, green or blue.

The at least one transmissive diffraction structure is preferably further formed such that the light incident on the second side of the security element in a beam direction perpendicular to the plane spanned by the second side of the security element is transmitted in the direction of the beam direction through the substrate largely unchanged in its color spectrum. Here the change of the spectrum of the incident light in the range of from 460 nm to 660 nm is preferably less than 15%, preferably less than 10%, further preferably less than 5%. For an ideal white light source with almost constant intensity over the whole wavelength range, this means for example that the intensity for all wavelengths in the range 460 nm to 660 nm is almost identical after passing through the security element, except for the specified percentage. The transmissivity of the at least one transmissive diffraction structure and/or of the security element in the beam direction here is preferably greater than 30%, further preferably greater than 50%, and further preferably greater than 70%.

If the security element is observed not perpendicular to the plane spanned by the second side of the security element, but at a tilted angle, the transmission behavior preferably changes. The at least one transmissive diffraction structure preferably transmits light which is incident on the second side in a beam direction with an angular offset of more than 15°, in particular of more than 30° relative to the surface normal of the plane spanned by the second side of the security element, changed in its color spectrum in the direction perpendicular to the surface normal of the plane spanned by the second side of the security element or in the beam direction. When the partial area covered with the transmissive diffraction structure is observed, a change of the color spectrum of the incident light which is brought about by the transmissive diffraction structure thus appears, in particular, when tilted with an angular offset of more than 10°, in particular of more than 20°. Alternatively, a change of the color spectrum of the incident light in this area only appears when the security element is not tilted at a tilt angle of more than 70°, in particular of more than 50°. The tilt angle range in which these effects occur here is preferably between 10° and 70°, further preferably between 20° and 50°.

Further, it is also advantageous if the transmissive diffraction structure in a first tilt angle range changes the incident light in its color spectrum in a manner which differs from the change of the color spectrum of the incident light in a second tilt angle range.

The transmissive diffraction gratings are preferably selected from one or more of the following classes of transmissive diffraction gratings:

A first class of transmissive diffraction structures has, as diffraction structure, a relief structure which is a grating defined by the parameters relief shape, relief depth, grating period and azimuth angle, wherein the relief depth is between 900 and 1700 nm, in particular 1200 nm and 1500 nm, and the grating period is between 500 nm and 1500 nm, in particular between 600 and 1200 nm. The first class of transmissive diffraction structures preferably has mainly first- or higher-order diffraction effects.

The relief structure here is preferably molded into a surface of the substrate, in particular molded into the surface of the first side of the security element. The first relief structure here is preferably molded into the surface of the security element facing the observer. The boundary surface of the relief structure is thereby in particular a varnish-air boundary.

Further, it is alternatively also possible to form the transmissive diffraction structure as a relief structure molded between two transparent layers of the substrate. The refractive index of these layers here preferably differs by at least 0.1.

Further, it is advantageous if one of the two transparent layers is a replication layer and the other of the two transparent layers is a porous layer, wherein the pores of the porous layer are in particular filled with air. The porous layer can be an open-pored or closed-pored layer. The microporous molding of the layer here makes it possible to provide a layer the refractive index of which is close to the refractive index of air.

The layer thickness of the porous layer here is preferably between 2 and 50 µm, preferably between 2 and 20 µm.

According to a further preferred embodiment one of the two transparent layers is a replication layer and the other of the two transparent layers is an HRI layer (HRI=High Refractive Index), for example made of ZnS, TiO$_2$, ZrO$_2$ or Si$_3$N$_4$ or a mixture of polymers and nanoparticles.

The layer thickness of the HRI layer is preferably between 50 and 300 nm, in particular between 75 and 150 nm, further preferably between 75 and 125 nm. In the embodiment with HRI layer the relief depth is typically in the range of from 200 nm to 800 nm and preferably between 300 nm and 600 nm. The grating period preferably lies in the range of from 450 nm to 900 nm and further preferably between 500 nm and 800 nm.

The replication layer preferably consists of a thermoplastic or UV-curable varnish layer.

The transmissive diffraction structures of a second class of transmissive diffraction structures are formed as follows: the transmissive diffraction structure is formed of a plurality of elements, wherein the elements in each case have at least one element surface arranged substantially parallel to a base plane, the elements are arranged offset relative to each other in relation to at least one first direction running parallel to the base plane and the element surfaces of neighboring elements are spaced apart in a direction perpendicular to the base plane, according to a variation function dependent on the at least one first direction, by a first distance or a multiple of the first distance. The variation function is preferably a periodic function. Further, in each period of the variation function the element surfaces of at least two elements following on from each other in the at least one first direction are preferably spaced apart from each other by the first distance. The period here is preferably chosen to be smaller than 10 µm and greater than 1 µm and in particular smaller than 5 µm and greater than 2 µm. Each period preferably comprises 3 to 10, in particular 3 to 6 successive elements. The first distance is preferably between 50 and 1000 nm, in particular between 100 and 500 nm.

It has been shown that, by means of such structures, a particularly marked change of the color spectrum of the light transmitted through the transmissive diffraction structure can be achieved. The tilt angle range in which a change of the color spectrum is brought about by the transmissive diffraction structure when observed in transmitted light is set here by the period and the variation function. The spectral range in which a change of the color spectrum of the incident light is brought about by the transmissive diffraction structure in transmitted light is fixed by the parameters first distance and period.

The substrate here can have a transparent layer, in which the elements are embedded. Further, it is also possible for the elements to be formed of partial areas of a transparent layer of the substrate and for the element surfaces to form at least one partial area of a surface of this layer and thus to define a surface relief formed in this layer.

Symmetrical stepped functions which describe for example a sequence of step pyramids are preferably used as variation function. However, it is further also advantageous to use a function that is asymmetrical within a period as variation function.

A third class of transmissive diffraction structures is formed of specific zero-order diffraction gratings defined by the parameters relief shape, relief depth, grating period and azimuth angle. These transmissive diffraction gratings have a relief depth between 100 nm and 500 nm, in particular between 300 nm and 500 nm, preferably between 350 nm and 500 nm and a grating period between 250 nm and 700 nm, preferably between 300 nm and 600 nm and in particular preferably between 350 nm and 600 nm. Diffraction gratings with a sinusoidal relief shape are particularly preferred. The relief structure of the diffraction grating here is preferably molded between a transparent layer and a transparent waveguide layer, in particular an HRI layer (HRI=High Refractive Index). The thickness of the HRI layer here is between 50 nm and 250 nm, preferably between 130 and 250 nm, in particular between 150 and 220 nm.

Unlike the known reflective zero-order diffraction gratings, which have much smaller relief depths, the transmissive zero-order diffraction gratings according to the invention display a much stronger color-change effect when observed in transmitted light.

According to a further preferred embodiment example of the invention the substrate has, in the first area, one or more reflective diffraction structures which display one or more optical security features when observed in reflected light. A plurality of first partial areas which are covered with one of the one or more transmissive diffraction structures and a plurality of second partial areas which are covered with one of the one or more reflective diffraction structures are preferably provided in the first area. It is hereby possible to achieve that in the first area, both when observed in transmitted light and when observed in reflected light, the security element displays a security feature, wherein the security feature when observed in reflected light preferably differs from the security feature when observed in transmitted light. For this, the first and second partial areas in each case preferably have at least one lateral dimension of less than 300 μm, in particular less than 150 μm, preferably of less than 80 μm. Further, at least in areas, first and second partial areas are arranged next to each other, with the result that in the first area a second item of optical information determined by the second partial areas appears when observed in reflected light and a first item of optical information determined by the first partial areas appears in transmitted light. For example the denomination of a banknote can be represented in reflected light and the currency sign or currency symbol can be represented in transmitted light.

Further, it is advantageous if a security element according to the invention has, in addition to the above-described transmissive and opaque areas, also further areas of surface in which other, in particular known, security features are arranged which are recognizable in reflection and/or transmission. For example, these can be diffraction structures which are covered with reflective layers, e.g. metal layers and/or HRI layers, over the whole surface or only over areas of the surface. For example they can be structures with a refractive effect like e.g. microlenses or microprisms. For example, they can be thin-film elements with a color-change effect. For example, they can be printed optically variable OVI effect inks (OVI=Optically Variable Inks). For example, they can be one or more volume hologram layers.

The security element is preferably formed of a laminating film, a transfer layer of a transfer film, a security thread or a label. However, it is also possible for the security element to be formed as a security document or value document, for example as a passport or ID card.

BRIEF DESCRIPTION OF THE DRAWINGS

The invention is explained by way of example below with reference to several embodiment examples with the aid of the attached drawings.

FIG. 1b shows a schematic sectional representation of the security document according to FIG. 1a.

FIG. 6a to FIG. 6g show several diagrams.

FIG. 7b shows an enlarged representation of a section of the security element according to FIG. 7a.

FIG. 8b shows an enlarged representation of a section of the security element according to FIG. 8a.

FIG. 9a shows a schematic representation to illustrate the optical appearance arising in a transparent area of a security element in a first observation situation.

FIG. 9b shows a schematic representation to illustrate the optical appearance arising in the security element according to FIG. 9a in a second observation situation.

FIG. 10 shows a schematic sectional representation of a device for inspecting the security element according to FIG. 9a.

FIG. 12b shows a schematic representation of a first observation situation of the security element according to FIG. 12a.

FIG. 12c shows a schematic representation of a second observation situation of the security element according to FIG. 12a.

FIG. 14b shows a schematic top view of a motif area of the security element according to FIG. 14a.

FIG. 14c shows a schematic top view of two overlapping motif areas of the security element according to FIG. 14a.

DETAILED DESCRIPTION OF THE INVENTION

Figure 1A:
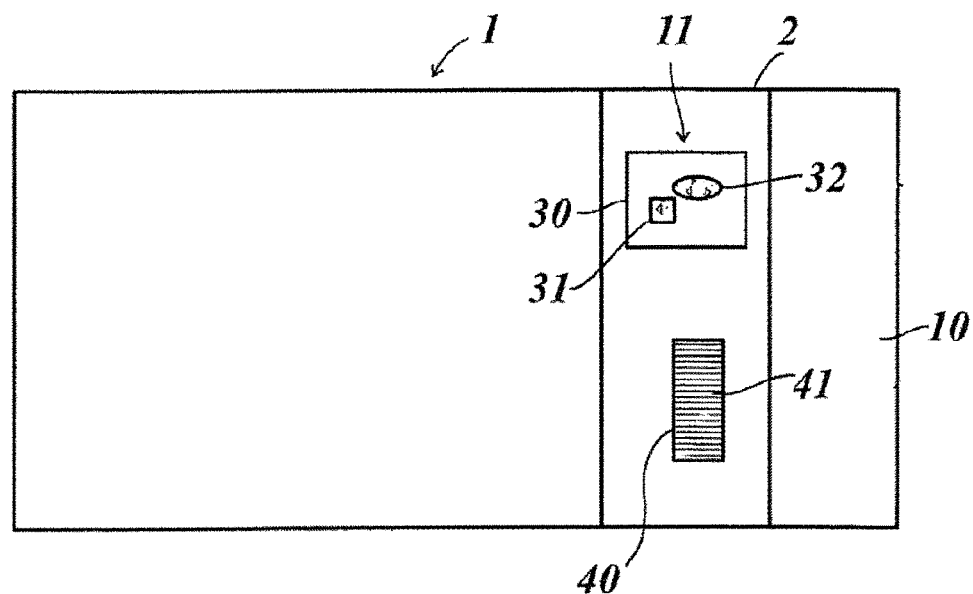
FIG. 1a shows a schematic top view of a security document.
Figure 1B:
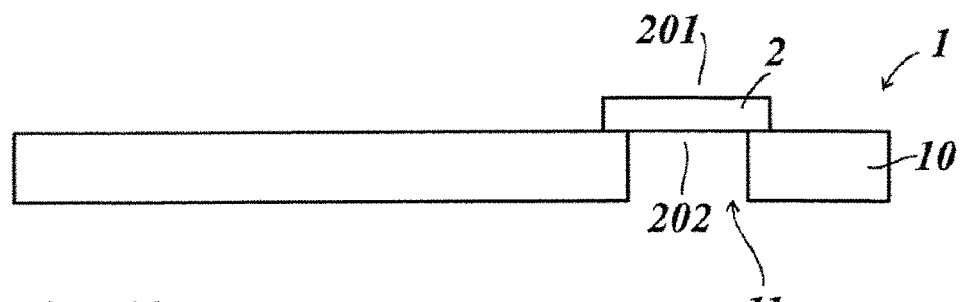

FIG. 1a and FIG. 1b show a security document 1 with a carrier substrate 10 and a security element 2 applied to the carrier substrate 10.

The security document 1 is preferably a banknote, an ID document such as for example a passport, a stock certificate, a security label for product protection or a software certificate.

The carrier substrate 10 preferably consists of a paper substrate, further preferably of a security paper. However, it is also possible for the carrier substrate 10 to consist of a plastic material or for it to be a multi-layer substrate here which comprises one or more plastic and/or paper layers. Further, it is possible for the carrier substrate 10 to be provided with one or more print layers, for example a security imprint, or security elements, for example a watermark, a security thread or an imprint consisting of an optically variable printing material.

The carrier substrate 10 has a transparent area 11. The transparent area 11 is preferably formed of an opening, breaking through the carrier substrate 10, which was introduced into the carrier substrate 10 for example with the aid of a watermark or a stamping process. Further, it is also possible for one or more layers of the carrier substrate which are, however, formed transparent to be provided in the transparent area 11 of the carrier substrate 10. Thus the carrier substrate 10 has for example one or more transparent carrier layers, consisting of plastic, over the whole surface, which are provided with an opaque covering layer outside the transparent area 11. Outside the transparent area 11 the carrier substrate 10 is preferably formed opaque or translucent. The carrier substrate 10 can be comparatively thin, e.g. 50 μm to 200 μm thick, and flexible, e.g. for a banknote, or also comparatively thick, e.g. 250 μm to 2000 μm thick, and stiff, e.g. for an ID card.

On one side of the carrier substrate 10 the security element 2 is applied such that a transparent area 30 of the security element 2 covers the transparent area 11 of the carrier substrate 10 at least in areas.

The security element 2 is preferably the transfer layer of a transfer film, or a laminating film which is applied to a side of the carrier substrate 10 by means of an adhesive layer. In the embodiment example according to FIG. 1a and FIG. 1b the security element 2 is shaped in the form of stripes and extends over the whole width of the security document 1 between two opposite edges of the carrier substrate 10. However, it is also possible for the security element 2 to have another shaping, for example a shaping in the form of patches.

Further, it is also possible for the security element 2 not to be applied to a side of the carrier substrate 10, but to be embedded in the carrier substrate 10, for example to be embedded between two layers of the carrier substrate 10.

The security element 2 has a top side 201 and a bottom side 202.

The security element 2 preferably consists of a flexible, multi-layer film element. The security element 2 here has an area 30 that is transparent in transmitted light. The area 30 here can, as shown for example in FIG. 1a, extend only over a partial area of the security element 2. However, it is also possible for the transparent area 30 to extend over the whole security element 2, i.e. the whole security element 2 is transparent in transmitted light.

By area that is transparent in transmitted light is meant here an area of the security element 2 in which, when observed in transmitted light, at least at one tilt angle, the transmissivity for at least one wavelength range of at least 30 nm from the wavelength range of the light visible to the human eye is greater than 20%, further preferably greater than 50% and further preferably greater than 70%. At least at one tilt angle, the transmissivity is preferably more than 50% in the wavelength range of from 460 nm to 660 nm and further preferably more than 80% in at least half of the wavelength range of from 460 nm to 660 nm.

Further, the transparent area 30 preferably has at least one partial area which, when observed in transmitted light, at least at one tilt angle, is transparent and clear, with the result that optical information arranged behind the security element 2, i.e. on the side of the security element 2 facing away from the observer, is visible to the human observer through the transparent area 30. By clear is meant a scattering and/or absorption of less than 40%, further preferably of less than 20%.

In the transparent area 30 the security element 2 has one or more transmissive diffraction structures which display one or more optical security features when observed in transmitted light. Thus, for example, such diffraction structures are provided in partial areas 31 and 32.

Further, the security element 2 preferably also has at least one opaque area 40. One or more diffraction structures 41 acting in reflection are preferably provided here in the opaque area 40 of the security element 2.

Figure 1C:
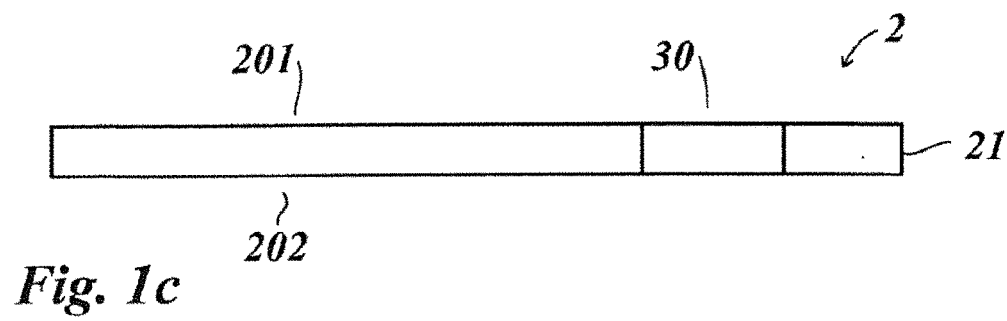
FIG. 1c shows a schematic sectional representation of a security element.

Further, it is also possible for the security element—as shown in FIG. 1c—as such to already form a security document 1, for example an ID document, a means of payment, a label for product protection, a security label or the like. Thus, for example, FIG. 1c shows the sectional representation of an ID card with a preferably multi-layer substrate 21 around the area 30 that is transparent in transmitted light. The substrate 21 has, in the transparent area 30, one or more transmissive diffraction structures which, when observed in transmitted light, i.e. when a light source emitting directional light is positioned on the back side 202 of the security element during observation from the front side 201, display one or more optical security features, as will also be described in even more detail in the following. The transparent area 30 and the substrate 21 can be covered over the whole surface on one side or both sides by further transparent, clear layers. The substrate 21 and the security document can be identical, i.e. the transmissive diffraction structures can be replicated directly into the surface of the security document, for example a polymer banknote or an ID card made of polycarbonate (PC).

Figure 2:
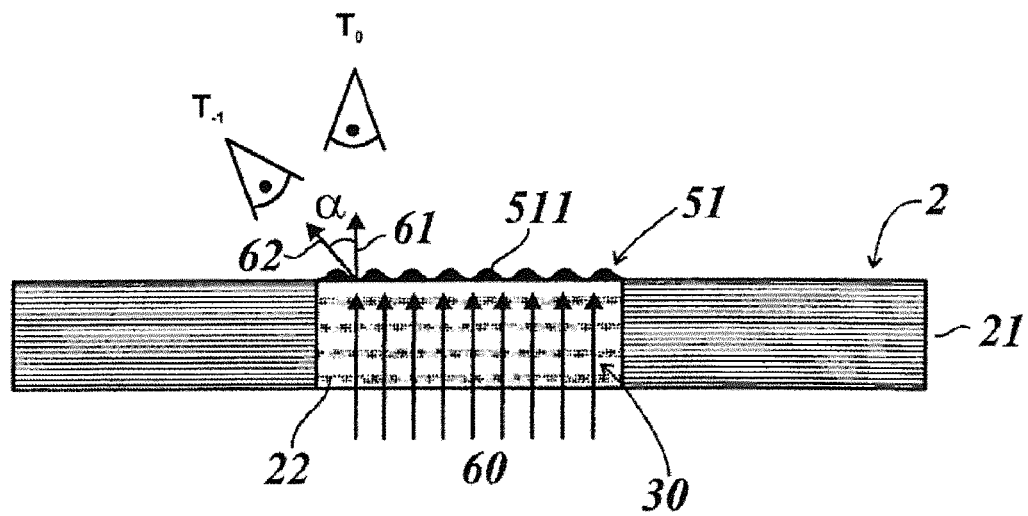
FIG. 2 shows a schematic sectional representation of a security element.

FIG. 2 shows the security element 2 with the substrate 21. The substrate 21 has, in the area 30, one or more transparent layers 22 as well as a transmissive diffraction structure 51. The transmissive diffraction structure 51 is formed of a relief structure 511 molded in a surface of the substrate 21. The relief structure 511 here is in particular molded into the surface of the security element 2 facing the observer. The relief structures 511 clearly differ from diffraction structures which are used for observation in reflection, as described in the following.

The relief shape of the relief structure 511 can be sinusoidal, rectangular, symmetrical or asymmetrical, triangular or even more complex. The diffraction is based on the difference in refractive index between air (n=1) and the material of the transparent layer 22, i.e. approximately n=1.5 if a polymer material is chosen. The layer 22 thus consists for example of a thermoplastic or UV-curable transparent plastic material, in the surface of which, by means of a replicating tool, the relief structure 511 is molded using heat and pressure, or is molded and UV-cured.

In a preferred embodiment not shown here the thus-formed surface grating is also additionally coated with a porous, air-filled layer. This layer has a refractive index close to 1.0. In order that this porous layer is transparent, the pores and/or aggregates which form the pores must be smaller than the wavelength of visible light. Such porous layers preferably have a refractive index smaller than 1.2. The layer thickness of the porous layer is preferably chosen to be in the range of from 2 μm to 50 μm, in particular between 2 μm and 20 μm.

Through this porous layer, the advantage is achieved that the relief structure 511 is protected, without destroying the diffraction properties of this layer.

Further, it is also possible to coat this porous layer with one or more further polymer layers, in particular protective layers.

When observed in transmitted light, light 60 now strikes the back side of the security element 21, is transmitted through the transparent area 30 with the diffraction structure 51 and is changed here as described in the following, and then strikes the eye of the observer positioned on the front side of the security element 2.

Figure 4A:
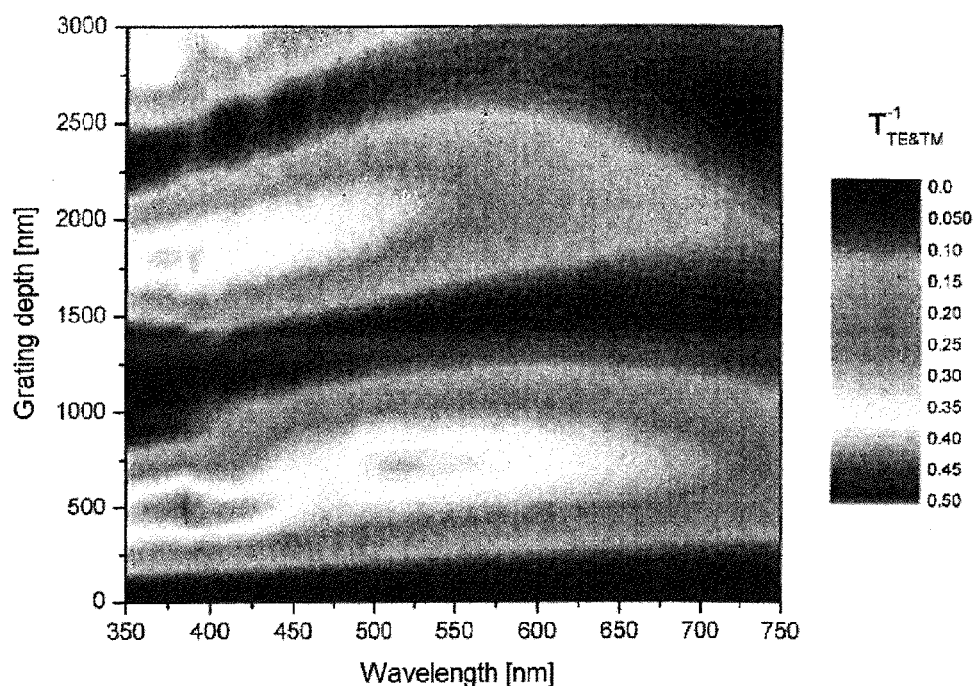
FIG. 4a to FIG. 4g show several diagrams.
Figure 4B:
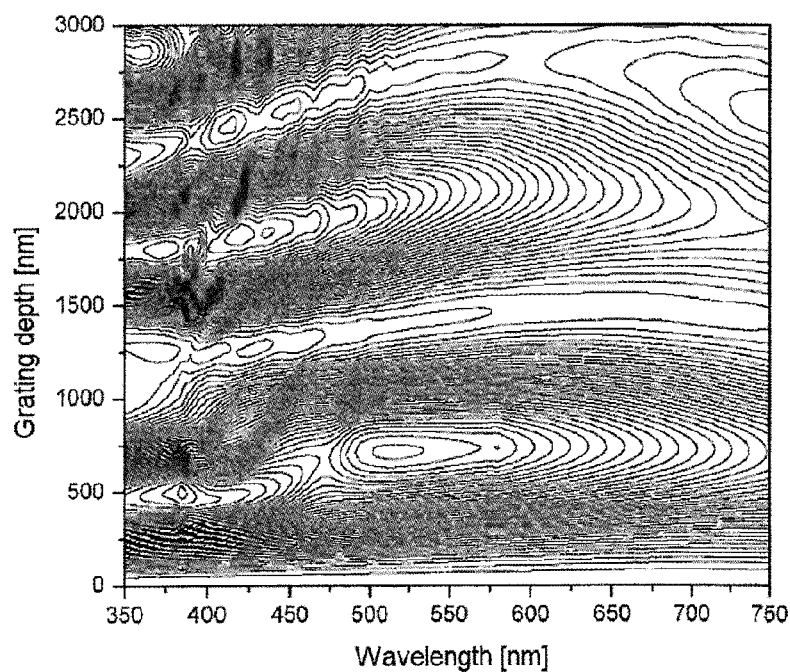
Figure 4C:
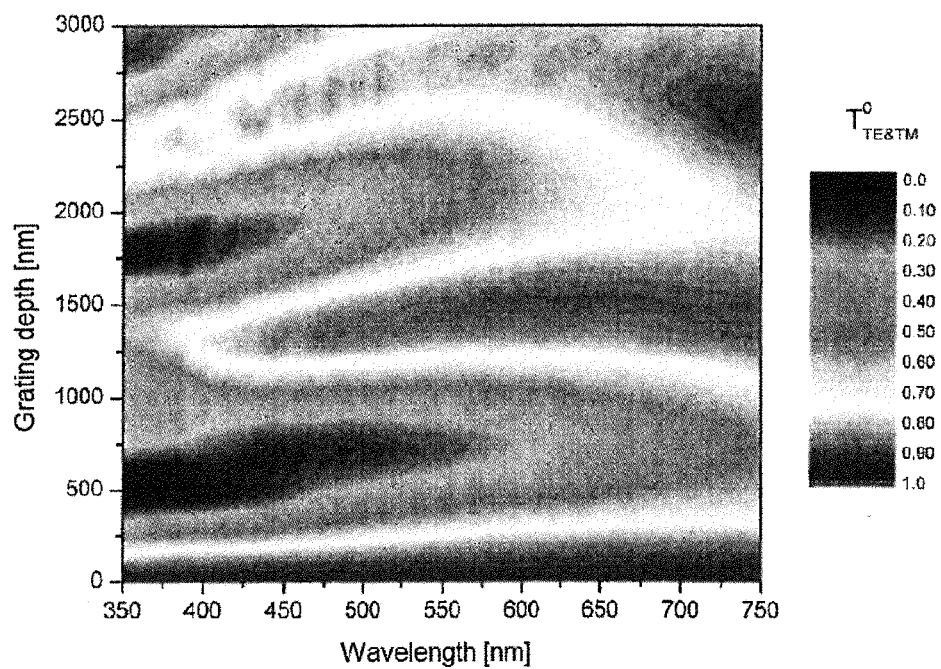
Figure 4D:
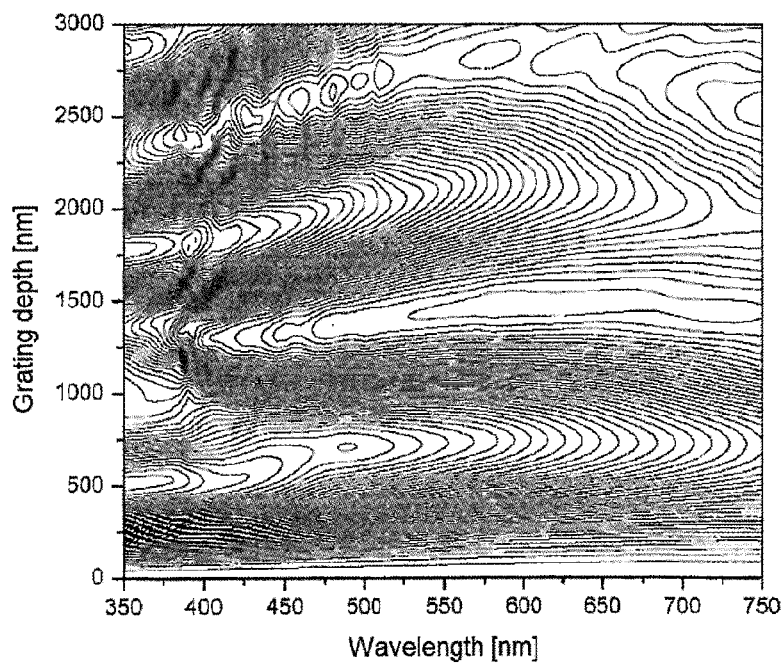

The diffraction efficiency in the zero 61 ($T_0$) and in the first 62 ($T_{+/-1}$) order very markedly depends, among other things, on the relief depth t of the relief structure 511. FIGS. 4a and 4b show the diffraction efficiency in the $+/-1^{st}$ order as a function of the wavelength and the relief depth. The relief structure 511 in this example is a relief structure with a grating period of 770 nm, and a sinusoidal relief shape. Further, FIG. 4a and FIG. 4b show the first-order diffraction efficiency averaged over the TE and TM polarization. The illumination angle is chosen to be perpendicular to the plane spanned by the back side of the security element 2, as represented in FIG. 2 correspondingly for the light incidence of the light 60. FIG. 4c and FIG. 4d show corresponding diagrams for the zero-order diffraction.

According to a preferred embodiment of the invention the relief structure 51 is now designed such that the relief structure 511, in addition to as strong as possible a first-order diffraction efficiency in transmitted light, has as uniform, i.e. color-neutral, as possible a zero-order transmission and the color spectrum of the transmitted light changes as little as possible there. The zero-order transmission here is preferably chosen to be greater than 30%, in particular greater than 50%, for the visible spectral range. Here, the range between 460 nm and 660 nm is preferably chosen as visible spectral range.

The investigations carried out thus reveal that the grating depth is to be chosen to be greater than 200 nm, in particular greater than 300 nm and further preferably greater than 400 nm.

To achieve the above-described effect, in which the light incident on the back side of the security element 2 in the beam direction perpendicular to the plane spanned by the back side of the security element 2 is transmitted in the direction of the beam direction through the substrate largely unchanged in its color spectrum, the relief depth of the relief structure 511 is preferably between 900 nm and 1700 nm, further preferably between 900 nm and 1500 nm and further preferably between 900 nm and 1200 nm.

An important relief parameter of the relief structure 511 is the grating period. As already known of reflection gratings, the diffracted wavelength shifts towards larger wavelengths when the grating period increases. This also applies to transmissive diffraction structures and is described by the so-called grating equation (I):

$$\sin\Theta \pm \sin\beta = \frac{m\lambda}{\Lambda}$$

Here, m stands for the diffraction order, λ for the wavelength, Λ for the grating period, Θ for the angle of incidence and β for the diffraction angle. It has been shown that, if the relief depth lies in the previously defined range, a broader range of grating periods can be used in order to set hereby a tilt angle range in which a color-change effect appears as an optical security feature.

The grating period of the relief structure 511 here preferably lies in the range of from 500 nm to 1500 nm, further preferably between 600 nm and 1200 nm.

Figure 4E:
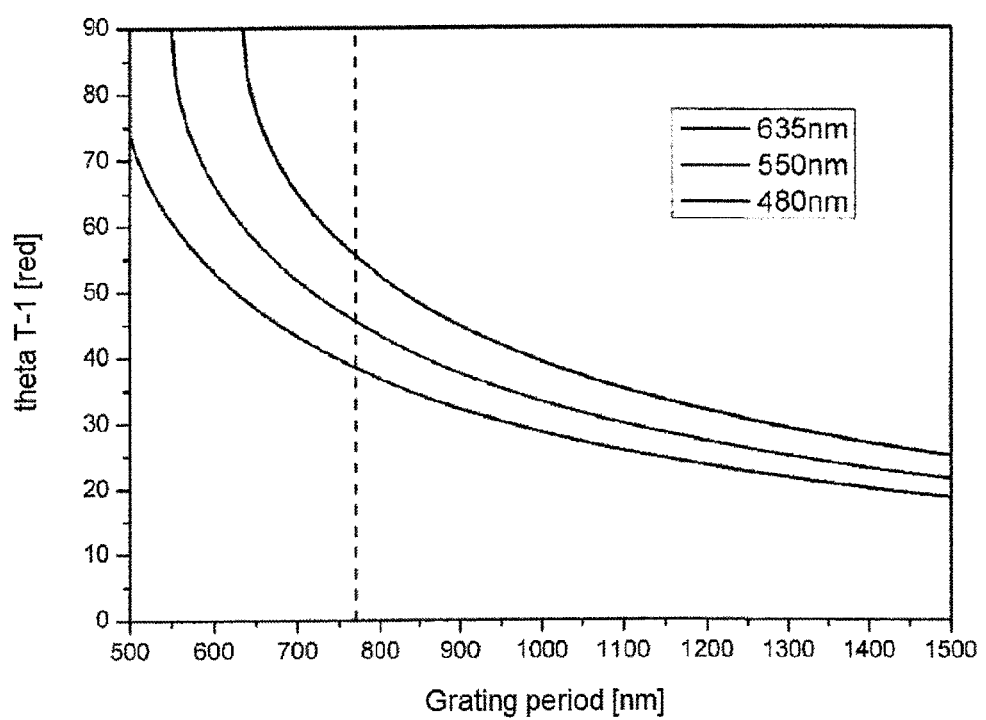

FIG. 4e here illustrates the dependency between this tilt angle or observation angle α and the grating period for the example wavelengths 480 nm (blue), 550 nm (green) and 635 nm (red). The diagram here was determined for a relief structure with a sinusoidal relief profile, a grating period between 500 nm and 1500 nm and the observation situation according to FIG. 2.

Through corresponding choice of the grating period, the color appearing in the partial areas of the transparent area 30 covered with the relief structure 511 when tilted or when the observation angle is changed and the tilt angle range or observation angle range in which this effect appears can thus be set.

Figure 3:
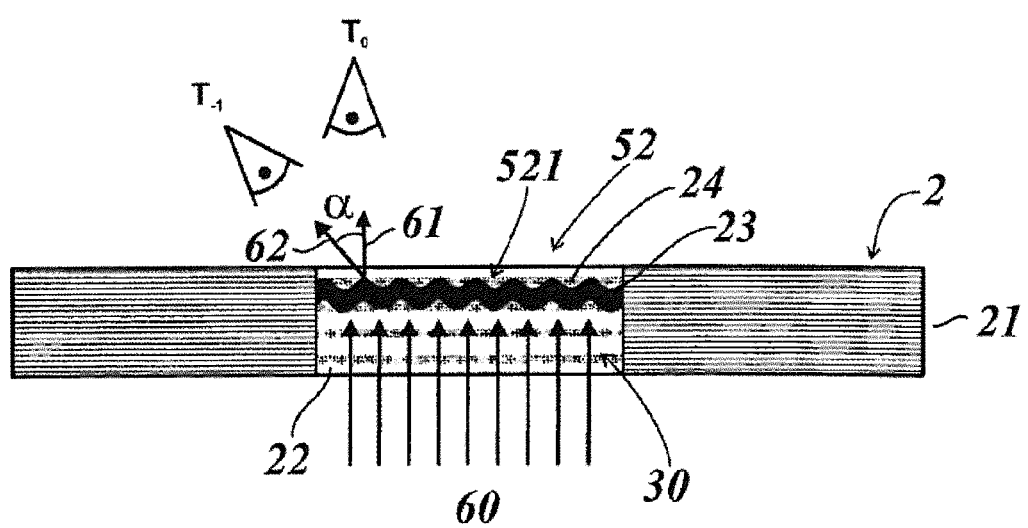
FIG. 3 shows a schematic sectional representation of a security element.

FIG. 3 shows a further embodiment example of the security element 2. The security element 2 consists of a preferably multi-layer substrate 21 which has a transmissive diffraction structure 52 in the area 30. In the area 30 the substrate 21 in the embodiment example according to FIG. 3 has, for this, three transparent layers 22, 23 and 24, wherein a relief structure 521 is molded as transmissive diffraction structure 52 between two of these layers.

The layers 22 and 24 are preferably transparent polymer layers, for example transparent layers which have a refractive index of approximately 1.5. The layer 23 is a diffraction-intensifying layer. Preferred materials and parameters of the diffraction-intensifying layer are:

Aluminum, copper, gold, titanium, silver or chromium, preferably with a layer thickness in the range of from 2 nm to 50 nm, i.e. a thin, transparent metallic layer.

Highly refractive transparent HRI materials (HRI=High Refractive Index) such as $TiO_2$, ZnS, $ZrO_2$, or $Si_3N_4$, preferably with a layer thickness in the range of from 50 nm to 250 nm. Alternative highly refractive HRI materials are hybrid materials consisting of highly refractive nanoparticles, for example $TiO_2$, embedded in a polymer matrix, for example in polyvinyl alcohol PVA.

The relief structure 521 has for example a sinusoidal, rectangular, symmetrical or asymmetrical, triangular or even more complex relief shape.

Figure 4F:
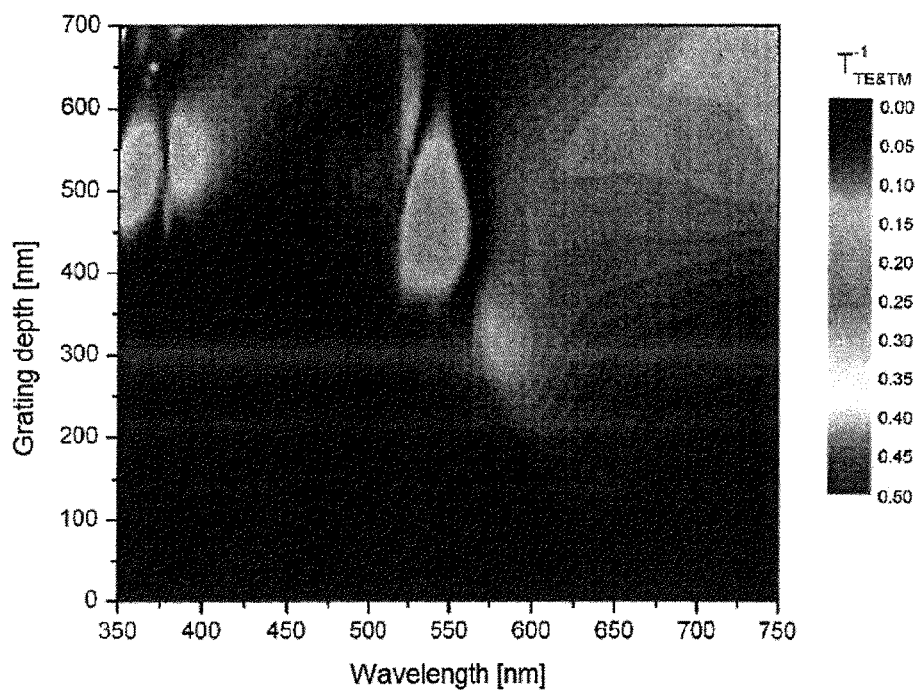
Figure 4G:
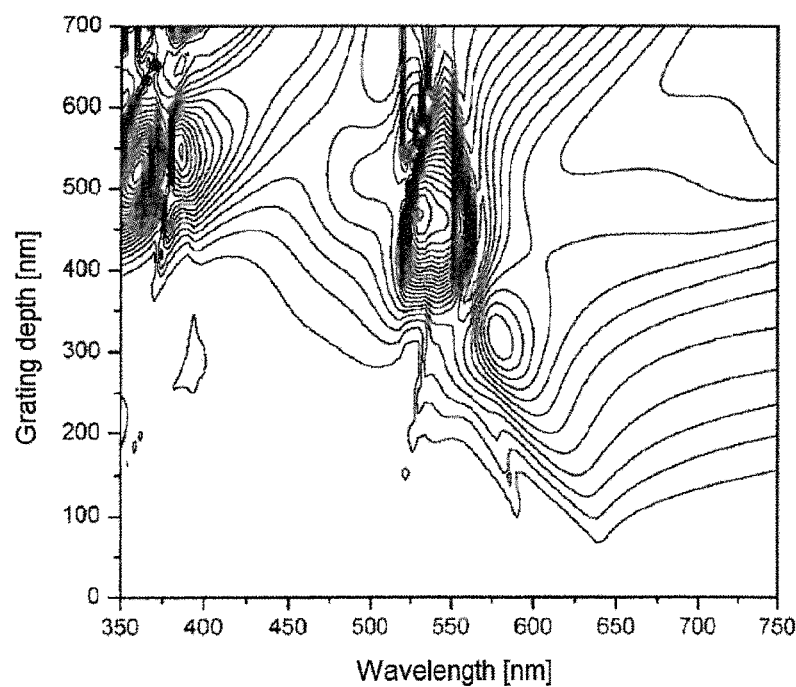

It has been shown here that, to provide a transmissive diffraction structure in the above sense, not only do the relief parameters relief depth and grating period play a role, but also the layer thickness and the material of the diffraction-intensifying layer. FIG. 4f and FIG. 4g here illustrate the ascertained dependency between diffraction efficiency in the first order ($T_{+/-1}$) and the relief depth as a function of the wavelength and the relief depth. The grating period in this example is 650 nm and the relief shape is sinusoidal. The diffraction-intensifying layer in this example consists of ZnS embedded in a polymer with a layer thickness of the ZnS layer of 120 nm. Further, the diffraction efficiency averaged over the TE and TM polarization is shown. This illustrates the effect of such structures in normal, i.e. unpolarized, illumination, e.g. in sun light or under fluorescent lamps or incandescent lamps.

Investigations on this basis have shown that, to provide transmissive diffraction structures in the above sense, preferably a grating depth of more than 200 nm and particularly preferably of more than 400 nm is thus to be chosen. At the same time the relief depth is chosen to be smaller than 700 nm and in particular smaller than 600 nm.

In a relief structure 521 which is optimized for the color green (diffraction peak between 500 nm and 550 nm) the relief depth preferably lies for example in the range between 400 nm and 550 nm.

In order to achieve a significant diffraction that is as spectrally-limited as possible, it has further proved to be advantageous to use, as diffraction-intensifying layer 23, an HRI layer with a layer thickness between 50 nm and 300 nm, preferably between 75 nm and 150 nm.

Further, it has been shown that the zero-order diffraction efficiency in the layer thickness range of from 75 nm to 125 nm is particularly uniform. A particularly color-neutral appearance when observed in the zero order is hereby achieved.

Further, investigations have shown that the grating period of the relief structures 521 is preferably to be chosen as follows:

For a color-change effect in the direction of green the grating period is preferably to be chosen to be in the range of from 620 nm to 690 nm, in the direction of red the grating period is to be chosen to be in the range of from 735 to 800 nm and in the direction of blue in the range of from 530 nm to 600 nm.

Through the corresponding choice of the relief parameters of the relief structure 521 in the above-described value ranges, a corresponding change in the color of the partial area of the area 30 covered with these structures can thus be achieved when the security element 2 is tilted. Further, through a corresponding combination of relief structures which are optimized for red, green, blue according to the parameters specified above, true-color images can also be realized by means of additive color mixing processes, as explained in even more detail further below. The relief structures are preferably chosen such that the colors of the partial areas desired for a defined observation angle are achieved with, in each case, the same layer thickness of the diffraction-intensifying layer. This makes it easier to produce such security features.

Figure 5:
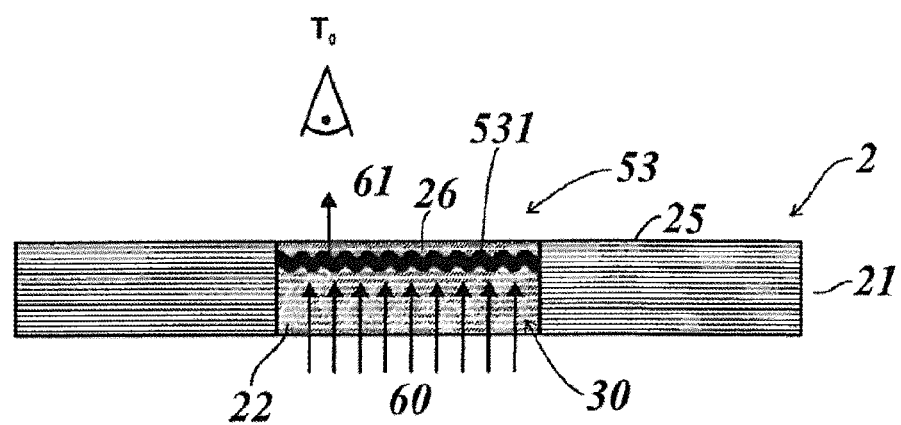
FIG. 5 shows a schematic sectional representation of a security element.

FIG. 5 shows a further embodiment example of the security element 2.

In the area 30 the substrate 21 has a transmissive diffraction structure 53. For this, in the area 30 the substrate 21 has a transparent layer 22 and a waveguide layer 25, wherein a relief structure 531 is molded between the transparent layer 22 and the waveguide layer 25. In the embodiment example according to FIG. 5 the substrate 21 thus has, in the area 30, two transparent polymer layers 22 and 26 and a waveguide layer 25 arranged between these, which is preferably formed of an HRI layer. $TiO_2$, $ZnS$, $ZrO_2$, or $Si_3N_4$ is preferably used as material for the HRI layer. Alternative highly refractive HRI materials are hybrid materials consisting of highly refractive nanoparticles, for example $TiO_2$, embedded in a polymer matrix, for example in polyvinyl alcohol PVA. The layer thickness of the HRI layer is preferably between 50 nm and 250 nm.

The relief structure 531 has a sinusoidal, rectangular, symmetrical, asymmetrical, triangular or even more complex relief shape. The relief structure 531 is a specific zero-order diffraction structure (grating period smaller than the target wavelength). The grating period of the relief structure 531 here is preferably chosen to be between 250 nm and 700 nm, further preferably between 300 nm and 600 nm.

Investigations have shown that, to achieve the effect of a transmissive zero-order diffraction structure, not only the relief parameters relief depth and grating period, but also the layer thickness of the highly refractive waveguide layer (HRI) have to be chosen correspondingly, in order to achieve the desired effect. This applies in particular to zero-order diffraction structures which are to appear color-neutral when observed perpendicularly.

Figure 6A:
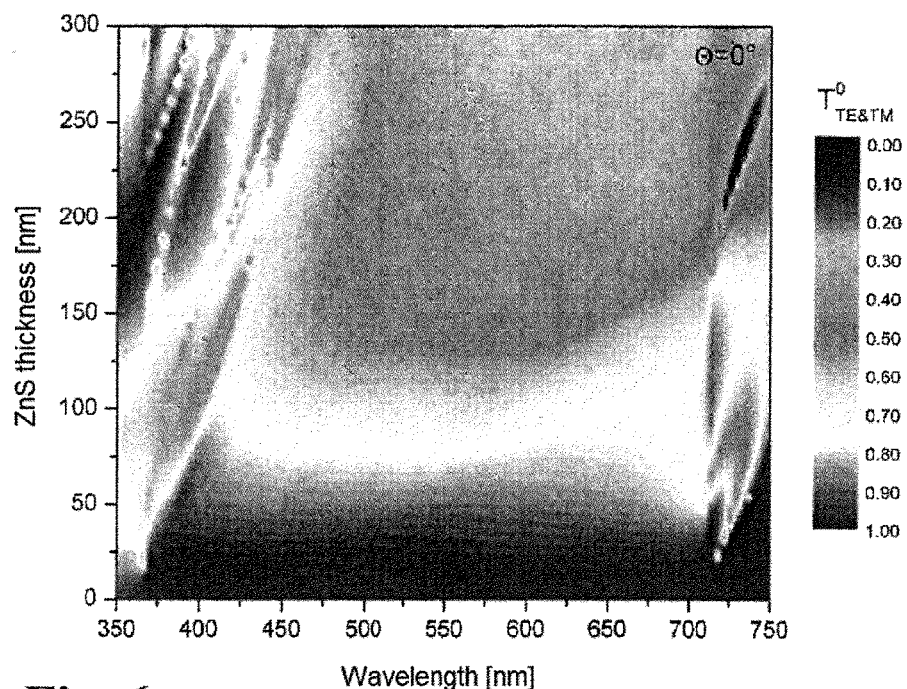
Figure 6B:
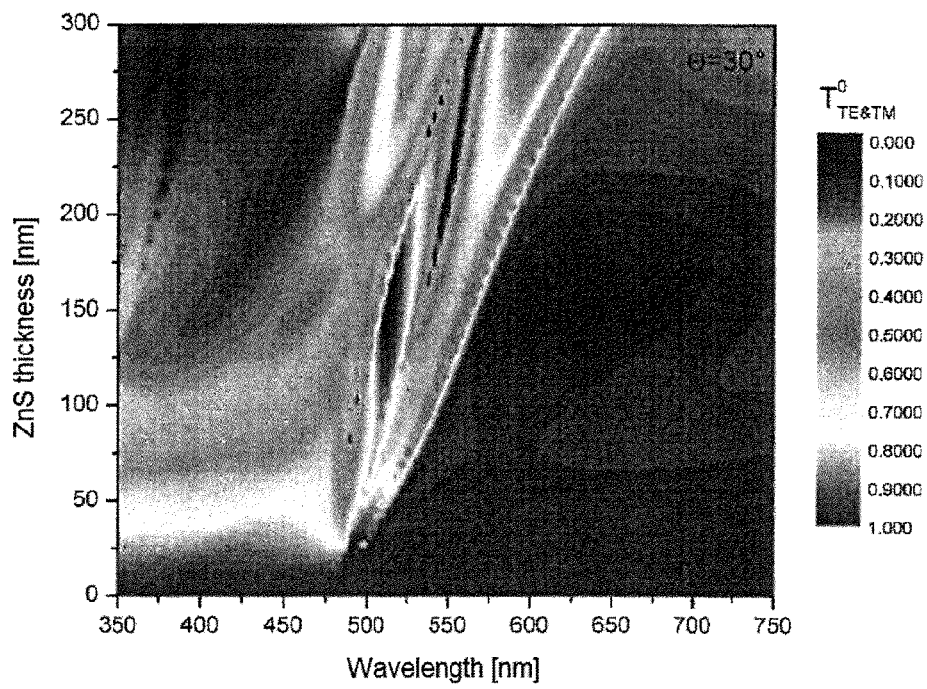

For this, FIG. 6a and FIG. 6b illustrate the dependency of the transmission of the diffraction structure 531 in perpendicular (0°) and, respectively, tilted (30°) illumination or observation in dependence on the wavelength and the layer thickness of the highly refractive waveguide layer, wherein here a relief structure with a sinusoidal relief shape, a grating period of 450 nm and a grating depth of 380 nm is chosen. For example ZnS was chosen as material for the highly refractive waveguide layer. FIG. 6a here shows the transmission in perpendicular observation and FIG. 6b the transmission in tilted observation.

Zero-order transmission means that the light moves on a straight line from the light source to the eye of the observer—if refraction in the security document or security element is disregarded.

From such investigations it has been revealed that in tilted observation a transmission minimum with T<20% can only be achieved from a thickness of the highly refractive transparent waveguide layer of more than 130 nm. This transmission minimum is essential in order to produce a color impression that is clearly perceptible to the human eye. Further, these investigations have shown that the transmission in perpendicular illumination and observation is uniform and even up to a thickness of the highly refractive, transparent waveguide layer of 250 nm is clearly over 25%. This makes an appearance that is undistorted in terms of color, i.e. color-neutral, possible in transmission at this angle. The investigations have thus revealed that the thickness of the highly refractive transparent waveguide layer is preferably to be chosen to be in the range of from 70 nm to 250 nm, further preferably in the range of from 130 nm to 220 nm.

Figure 6C:
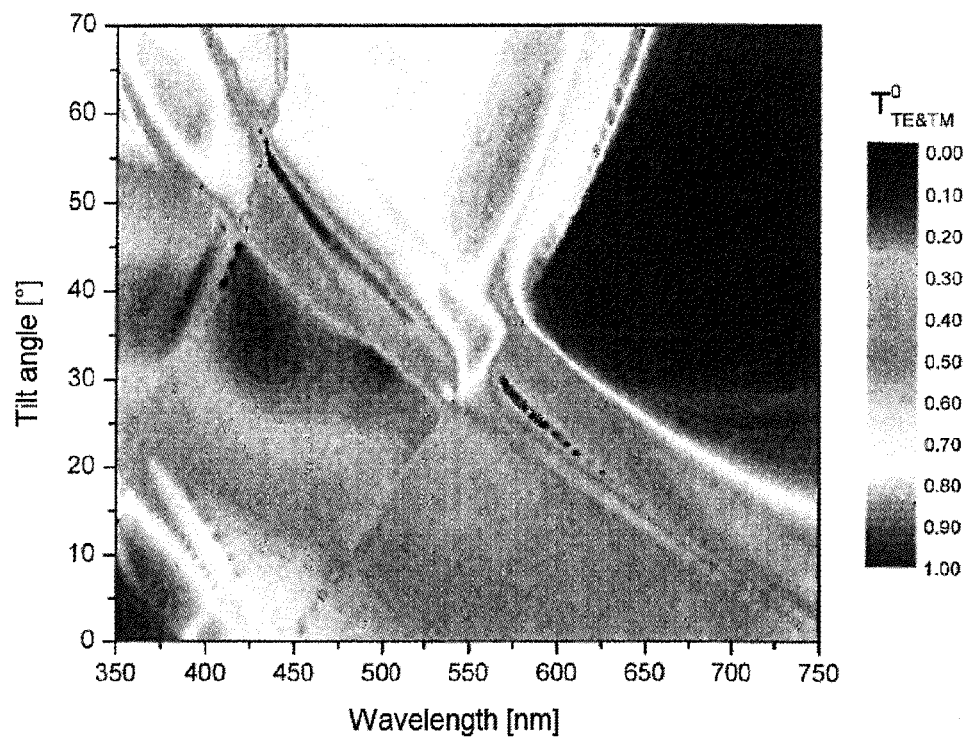
Figure 6D:
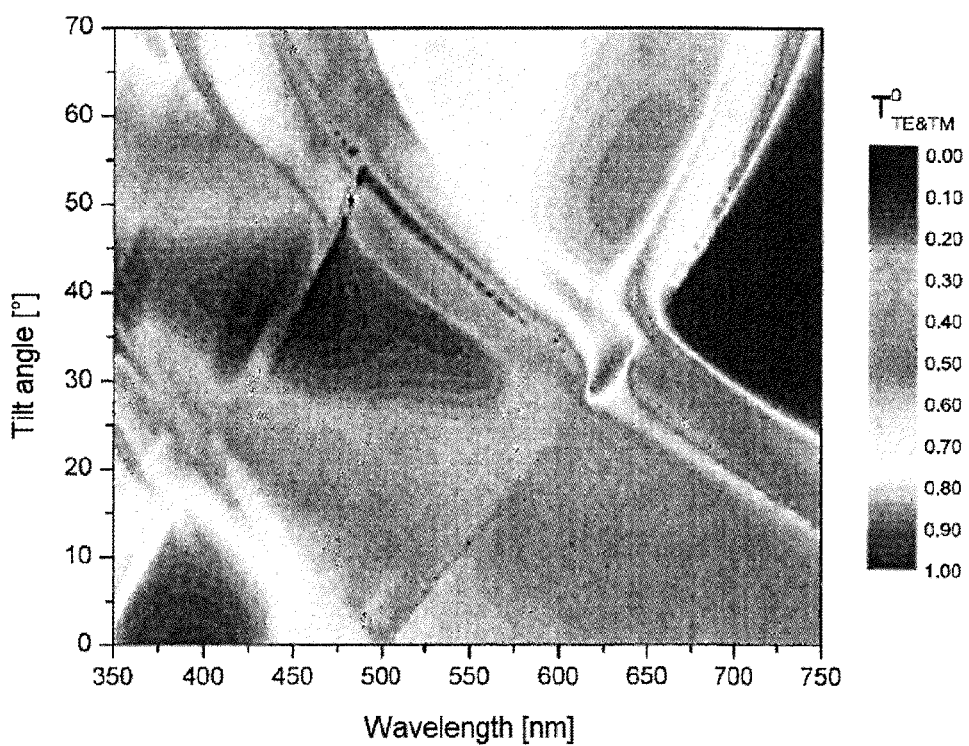

Further, investigations have shown that the spectral behavior of the diffraction grating 531 is also decisively influenced by the grating depth. Thus, FIG. 6c shows the dependency of the transmission of the diffraction grating 531 when the tilt angle is varied with a relief depth of 365 nm and grating period of 475 nm and FIG. 6d shows this with a relief depth of 430 nm and a grating period of 550 nm, wherein the relief shape is a sine profile and the highly refractive waveguide layer has a layer thickness of 180 nm.

Investigations based on this have shown that in tilted observation a transmission minimum with T<20% is only achievable from a relief depth of over 300 nm, wherein the perpendicular transmission even up to a grating depth of 550 nm lies clearly over 25%. The relief depth of the relief structure 531 is thus preferably chosen to be in the range of from 300 nm to 550 nm, further preferably in the range of from 350 to 500 nm.

With the choice of these parameters and alignment of the grating lines transverse to the direction of view, for example a color effect from color neutral in perpendicular observation to orange at a tilt angle of 30° and back to color neutral at a tilt angle of 60° thus arises, for example with the choice of a relief depth of 365 nm, a layer thickness of the transparent waveguide layer of 180 nm and a grating period of 475 nm. Further, for example a color effect from color neutral to light bluish in perpendicular observation to red at a tilt angle of approx. 30° and back to almost color neutral to light reddish at a tilt angle of 60° appears, with alignment of the grating lines transverse to the direction of view and choice of a relief depth of 430 nm, a grating period of 550 nm and a layer thickness of the transparent waveguide layer of 180 nm.

The grating period of the relief structure 531 is preferably chosen to be in the range of from 250 nm to 700 nm, further preferably in the range of from 300 nm to 600 nm. Through the choice of the period, the color appearing when tilted can in particular be set.

Further, investigations have shown that the effects can be achieved not only for linear gratings but also for cross gratings, hexagonal gratings or even more complex grating shapes of the relief structures. Here too, the corresponding choice of the grating depth is, as described above, a decisive factor for achieving the corresponding effects. FIG. 7a to FIG. 8b now illustrate a formation of the security element 2 according to a third class of transmissive diffraction structures.

Figure 7A:
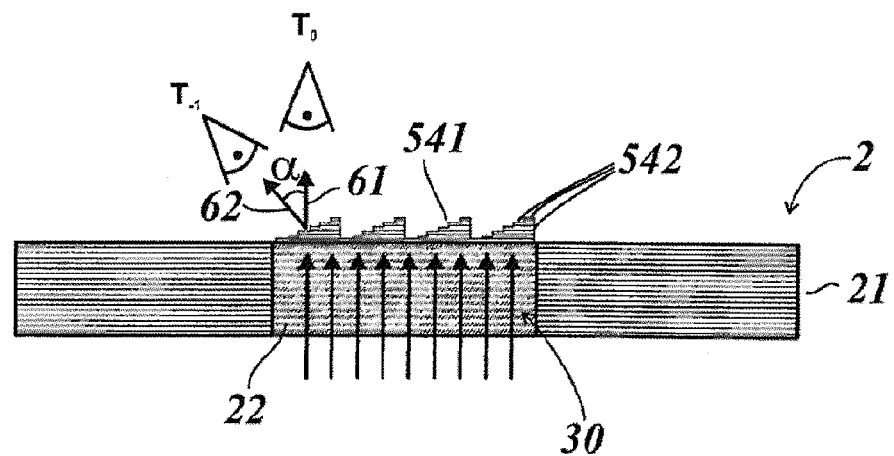
FIG. 7a shows a schematic sectional representation of a security element.
Figure 7B:
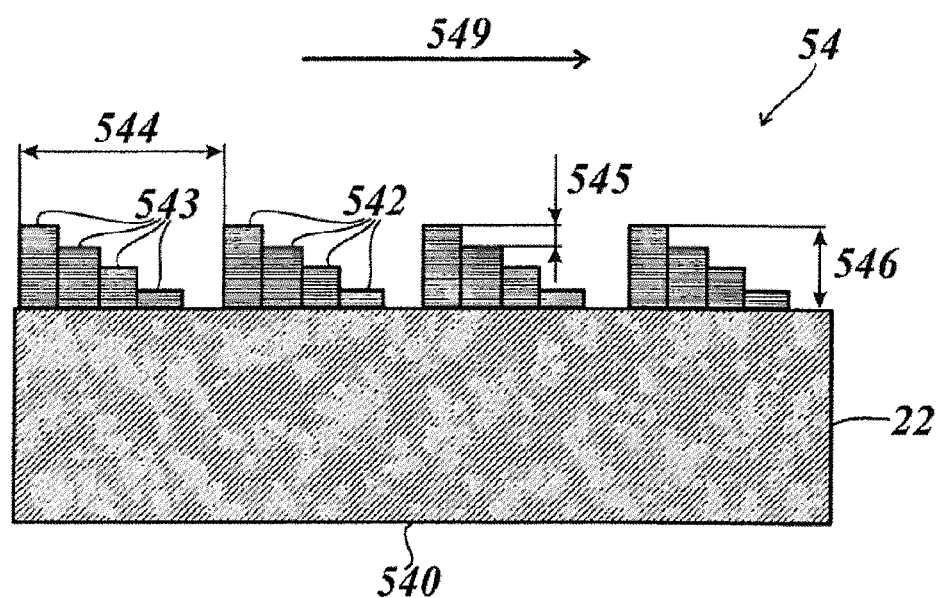

FIG. 7a shows the security element 2 with the substrate 21, which has a transmissive diffraction structure 54 in the area 30. The diffraction structure 54 consists of a plurality of elements 542 which in each case have at least one element surface 540 arranged substantially parallel to a base plane. This is also shown in FIG. 7b, which shows an enlarged representation of a partial area of the area 30. The base plane 540 here is preferably formed of the back side of the substrate 21 or the security element 2. However, it is also possible for the base plane 540 to have an incline relative to the plane spanned by the back side of the substrate and to be tilted slightly relative to this plane.

The elements 542 are arranged offset relative to each other in relation to at least one first direction 549 running parallel to the base plane, and the element surfaces 543 of neighboring elements 542 are spaced apart in a direction perpendicular to the base plane according to a variation function dependent on the at least one first direction 549, by a distance 545 or a multiple of the distance 545. The variation function here is a periodic function and, in each period 544 of the variation function, at least two of the elements 542 following on from each other in the first direction 549 are spaced apart from each other by the distance 545.

In the embodiment example according to FIG. 7a and FIG. 7b the elements 542 here form partial areas of a layer 22 of the substrate 21, namely such that the element surfaces determine the relief structure of at least one partial area of a surface of the layer 22. Thus, to produce the diffraction structure 54, a relief structure 541 is molded into the layer 22, which relief structure is formed such that it has a corresponding sequence of element surfaces 543.

Figure 8A:
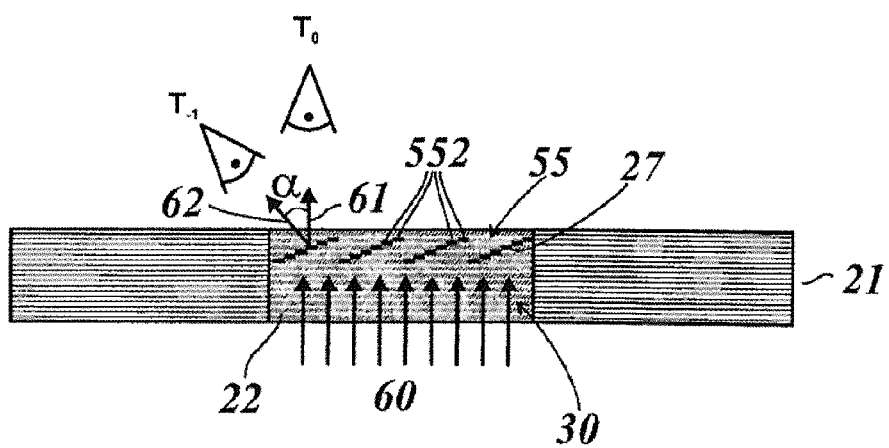
FIG. 8a shows a schematic sectional representation of a security element.
Figure 8B:
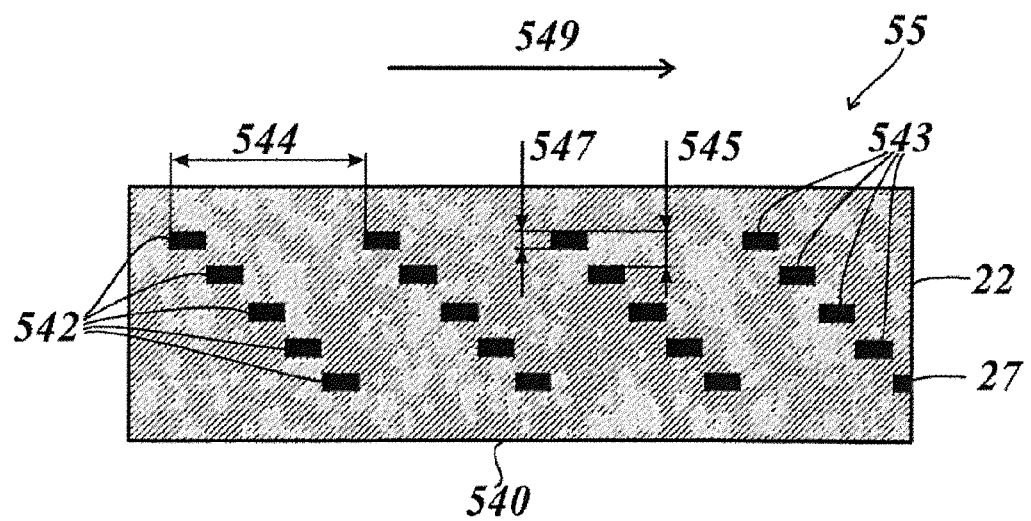

Further, it is also possible for the elements 543 to be formed of elements which are embedded in a transparent layer of the substrate 21. This embodiment is illustrated in FIG. 8a and FIG. 8b, wherein reference is made, in respect of the arrangement and formation of the elements 542, to the statements in this regard according to FIG. 7a and FIG. 7b.

The period 544 here is preferably chosen to be smaller than 10 µm and greater than 1 µm and in particular smaller than 5 µm and greater than 2 µm.

The distance 545 preferably lies in the range of from 50 nm to 1000 nm, further preferably between 100 nm and 500 nm.

The number of elements 542 per period is preferably chosen to be between 3 and 10, further preferably between 3 and 6. The maximum relief depth per period here is preferably less than 2 µm.

As variation function, functions are preferably used which, as shown in FIG. 7a to FIG. 8b, describe a step-shaped, periodic sequence of the element surfaces 543. In addition to the asymmetrical arrangement of the steps within the period 544, as shown in FIGS. 7a to 8b, however, it is also possible for there to be a symmetrical arrangement of the steps for example in the shape of a step pyramid.

In the embodiment according to FIG. 8a and FIG. 8b the thickness 547 of the elements 542 is preferably between 10 nm and 600 nm, further preferably between 50 nm and 400 nm. The elements 442 here are preferably formed of a highly refractive layer, i.e. an HRI layer, which can be formed of one of the materials already described for this previously. The layer 22 surrounding the elements 542 preferably consists of a polymeric, transparent plastic material with a refractive index of approximately 1.5.

Through the diffraction structures 54 and 55, interesting effects can be achieved. The color appearing in transmission at different angles is strongly influenced by the choice of the distance 554 and the tilt angle at which a change in the properties of the diffraction structures 54 and 55 influencing the color spectrum arises is set by the period 544. The color impression appearing in perpendicular observation here is strongly determined by the distance 554.

Through corresponding choice of the distance 554, not only can the effect be achieved here that the diffraction structures 54 and 55 generate a colored impression when observed in transmitted light in perpendicular observation and the element becomes color-neutral when tilted, but a dark or black appearance can also be achieved. Thus, for example in the formation of the relief structures 54 and 55 shown in FIG. 7a to FIG. 8b, if the total grating depth is chosen to be 1500 nm (distance 554=300 nm) and the period to be 2500 nm, a spectral behavior arises in which the spectral range of from 460 to 660 in transmission in perpendicular observation is smaller than 10% and is moderately transparent (t>30%) at a tilt angle of from 55 degrees to 65 degrees and thus is recognizable in back lighting.

By means of the above-described diffraction structures 51 to 55, through the choice of the structure parameters as described above, the optical properties of the area 30 can be changed such that, in particular, when observed in transmitted light against a light source radiating white light, two different color effects appear when the security element is tilted. Thus, the area 30 or a partial area of the area 30 can for example be transparent in perpendicular observation (untilted) and display a color when tilted, or vice versa, depending on the choice of the corresponding structure parameters.

The effects achievable hereby and advantageous arrangements of the areas covered with such diffraction structures within the area 30 are described in the following with reference to several embodiment examples.

FIG. 9a shows a first observation situation of a security element 2 and FIG. 9b a second observation situation of the security element 2.

In the observation situation according to FIG. 9a the observer observes the security element 2 against an indirect light source scattering white light. Here, this indirect light source is formed of an illuminated, white-colored wall 72. White walls typically scatter light like a Lambertian radiator. Further, a light source 71 is provided which emits white light directionally. The light 63 emitted by the indirect light source 72 and the light 60 emitted by the light source 71 here enclose a 90-degree angle. In the observation situation according to FIG. 9a the security element 2, as shown in FIG. 9a, is held perpendicular and in the observation situation according to FIG. 9b it is tilted compared with the position according to FIG. 9a. When tilted back and forth between the positions of the security element 2 according to FIG. 9a and FIG. 9b, the optical appearance of the area 30 changes, as shown in FIG. 9a and FIG. 9b. Thus, there for example, a blue cloud is shown in the partial area 31 and when tilted according to FIG. 9b a rainbow additionally appears in a partial area 32.

To provide this optical effect, for this, different ones of the previously described transmissive diffraction structures are arranged in the partial areas 31 and 32, wherein the transmissive diffraction structure arranged in the partial area 31 is designed correspondingly, in order to change the color spectrum in transmission in both observation situations such that a blue coloring appears, i.e. the light 63 changes to the light 64, and the diffraction structures arranged in the partial area 32 are chosen such that in the observation situation according to FIG. 9a the color spectrum is not changed or is changed only a little, and an influencing of the color spectrum of the transmitted light to represent the rainbow is only generated from a particular tilt angle, i.e. the light 60 is changed into the light 62. To achieve this effect, different ones of the above-described classes of diffraction structures are preferably used for the partial areas 31 and 32, in order thus to achieve a particularly contrasting effect between the areas 31 and 32. Thus, for example, for the partial area 32 transmissive diffraction structures are provided which are constructed like the diffraction structures 51 and 52, and for the diffraction structures arranged in the partial area 31 diffraction structures are provided which are formed like the diffraction structures 53 to 55.

FIG. 10 shows a corresponding device 81 for inspecting such a security element 2. The device 81 thus has two light sources 71 and 73, which emit light 60 and 65 in an angular offset relative to each other directionally onto the security element 2 held in a guide device. By switching one or other of the light sources 71 and 73 respectively on and off, a tilting of the security element around the angular offset between the beam direction of the light emitted by the light sources 71 and 73 can be simulated, with the result that the observer for example sees the representation according to FIG. 9b in the area 30 when both light sources 71 and 73 are activated and sees the representation according to FIG. 9a when only the light source 73 is activated.

Figure 11A:
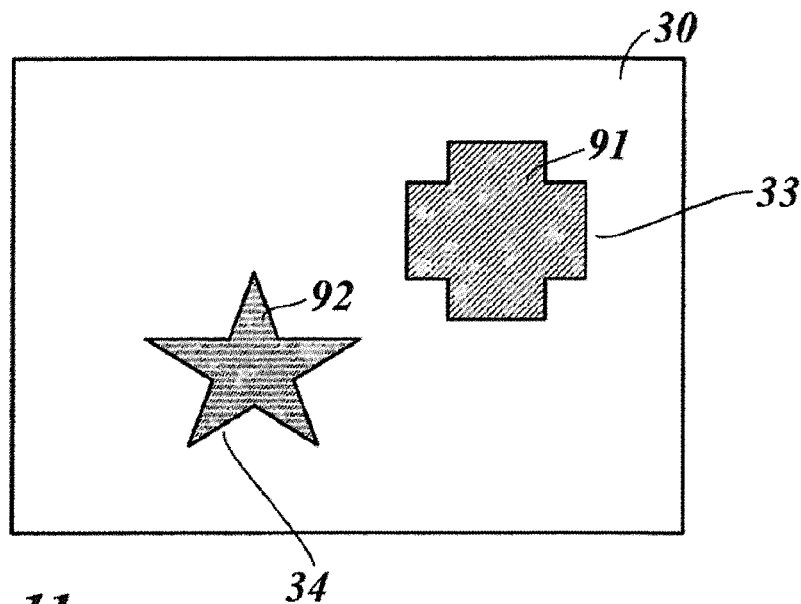
FIG. 11a shows a schematic top view of a transparent area of a security element.
Figure 11B:
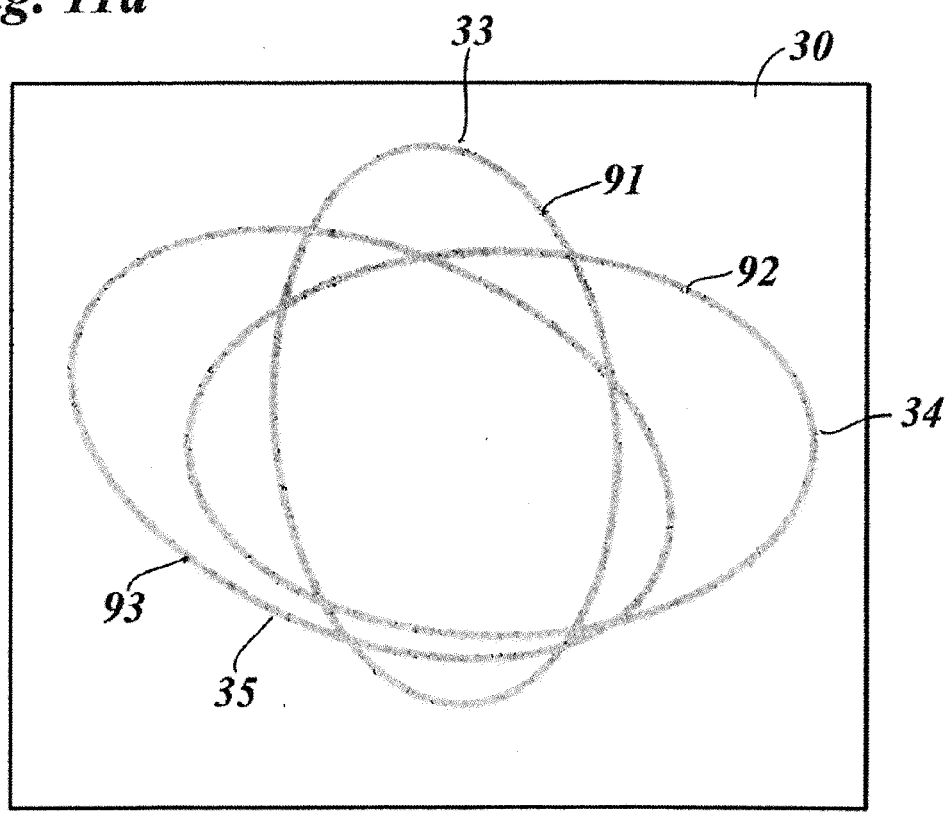
FIG. 11b shows a schematic top view of a transparent area of a security element.
Figure 11C:
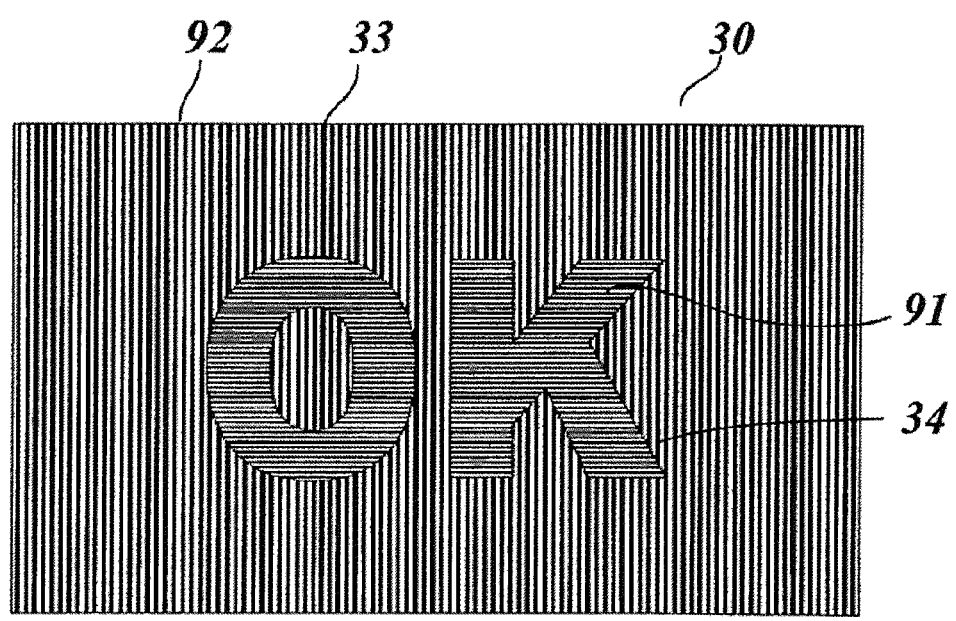
FIG. 11c shows a schematic top view of a transparent area of a security element.

FIG. 11a to FIG. 11c illustrate possible embodiments of a security element 2 in which, in the area 30, two or more patterned partial areas are provided which are covered with different transmissive diffraction structures which display one or more optical security features when observed in transmitted light.

FIG. 11a thus shows an area 30 with a zone 33 which is covered with a transmissive diffraction structure 91, and a zone 34 which is covered with a transmissive diffraction structure 92. The diffraction structures 91 and 92 are formed like one of the above-described diffraction structures 51 to 55, with the result that in this respect reference is made to the above statements. The diffraction structures 91 and 92 are different diffraction structures, in particular different ones of the above-described diffraction structures 51 to 55. Further, it is also possible for the diffraction structures 91 and 92 to be selected from the same class of diffraction structures, but to differ in their structure parameters and thus their optical properties. Thus, it is possible for example for the diffraction structures 91 and 92 to differ in their relief depth, their azimuth angle and/or their grating period.

The zones 33 and 34 in each case are formed patterned in the form of a motif, namely formed in the form of a cross and a star, as shown in FIG. 11a. The zones 33 and 34 further preferably have lateral dimensions of more than 300 µm, in particular of more than 500 µm, in particular a width and a length between 1 mm and 25 mm, further preferably between 5 mm and 15 mm.

In the embodiment example according to FIG. 11b not only two zones 33 and 34, but several zones, namely the zones 33, 34 and 35, are provided which are formed in the form of thin lines. The lines preferably have a width of less than 300 µm, further preferably of less than 100 µm and a length of more than 300 µm, further preferably of 1 mm. The lines here are preferably molded in the form of a complex pattern, for example a guilloche. Further, the partial areas 33, 34 and 35 are covered with different transmissive diffraction structures, which are formed like the diffraction structures 51 to 55, here covered with the diffraction structures 91, 92 and 93.

In the embodiment example according to FIG. 11c the zones 33 and 34 form a common motif, wherein the zone 33 forms the background area and the zone 34 the foreground area of the motif. The zone 33 and the zone 34 here are covered with different diffraction structures which are formed like the above-described diffraction structures 51 to 55. The diffraction structures 91 and 92 here preferably differ in their azimuth angle, are preferably arranged turned relative to each other in relation to their azimuth angle by 45 degrees or 90 degrees. If the parameters of the diffraction structure 90 and 92 are otherwise chosen to be identical, the zones 91 and 92 display the same optical effect when observed perpendicularly in transmitted light, with the result that the motif is not visible, because of a lack of contrast between foreground and background area. The motif then becomes recognizable when tilted.

The same applies to a turning in the tilted state: in the unturned state (e.g. azimuth angle 0°) the zones 91 and 92 display the same optical effect, with the result that the motif is not visible, because of a lack of contrast between foreground and background area. When turned about a rotation angle (e.g. angle 45° or 90° or 180°) the motif then becomes recognizable.

In the formation as foreground and background area the zones covered with the different diffraction structures are preferably arranged less than 10 µm, preferably less than 5 µm and further preferably less than 2000 nm away from each other.

The diffraction structures 91 to 93 in the above embodiment examples according to FIG. 11a to FIG. 11c are preferably designed such that, when observed in transmitted light against a light source which emits white light parallel to a beam axis onto the back side of the security element 2, a change in the color of the zones 33, 34 or 35 appears when the security element is tilted relative to the beam axis. Further, the diffraction structures 91 to 93 are preferably designed such that the light incident in a beam direction perpendicular to the plane spanned by the back side of the security element 2 is transmitted in the direction of the beam direction through the substrate largely unchanged in its color spectrum, with the result that in this observation situation the area 30 in particular appears transparent and clear, and objects lying behind it for example are visible through the area 30. This additionally increases the security of the security element 2.

In colored illumination the corresponding effect generated by the diffraction structures 91 to 93 is still superimposed by the color effect of the illumination spectrum.

A further embodiment example in which the zones 91 and 92 form the foreground and background area of a motif is illustrated in the following with reference to FIG. 12a to FIG. 12c.

Figure 12A:
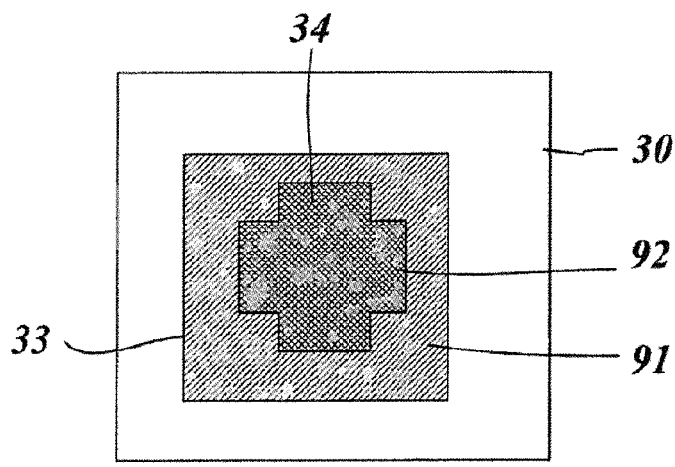
FIG. 12a shows a schematic top view of a transparent area of a security element.

FIG. 12a shows an area 30 of the security element 2. The zone 34 is formed patterned in the form of a cross and the zone 33 is formed as the background area for the zone 34. The areas 33 and 34 are covered with the diffraction structures 91 and 92. The diffraction structures 91 and 92 here are formed by one of the diffraction structures 51 to 55, with the result that in this respect reference is made to the above statements. The two diffraction structures 91 and 92 here are preferably designed such that they display the same optical effect in at least one observation situation, for example are color-neutral in transmitted light, and do not change or only slightly change the color spectrum.

Figure 12B:
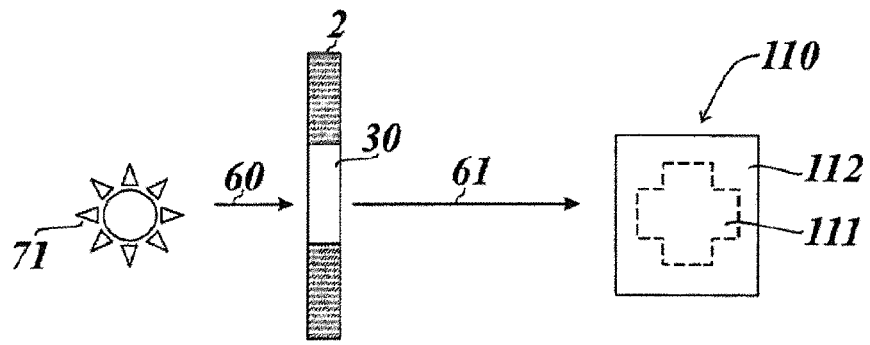
Figure 12C:
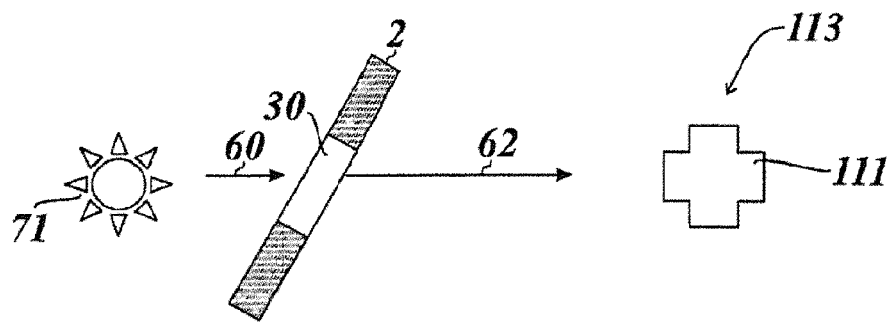

Thus, for example, in the observation situation according to FIG. 12b, in which the security element 2 is held at right angles to the beam direction of a light 60 emitted by a light source 71, the zones 33 and 34 display the same optical effect, i.e. for example in this observation situation the color spectrum is not changed or is changed in the same way. In this observation situation the image 110, in which foreground 111 and background 112 have the same color and thus cannot be distinguished from each other, is thus generated by the light 61 transmitted through the area 30. When tilted the influencing of the transmitted light by the diffraction structures 91 and 92 then differs, with the result that the transmitted light 62 displays an image 113 in which for example a motif in the form of a cross 111 is visible. If the diffraction structures 91 and 92 are identical linear gratings and are arranged rotated only by 90° in the azimuth angle, when turned in the tilted state the security element 2 displays a color flip—the colored appearance of the cross and that of the background swap.

Further, it is also possible to choose diffraction structures 91 and 92 such that at all tilt angles of the diffraction structures 91 and 92 the color spectrum is changed differently, with the result that a contrast between foreground and background is visible over a broader tilt angle range, but in each case the color of the foreground and background changes depending on the tilt.

Further advantageous embodiments described in the following have a plurality of different zones in the area 30, which in each case have at least one lateral dimension of less than 300 µm.

Figure 13A:
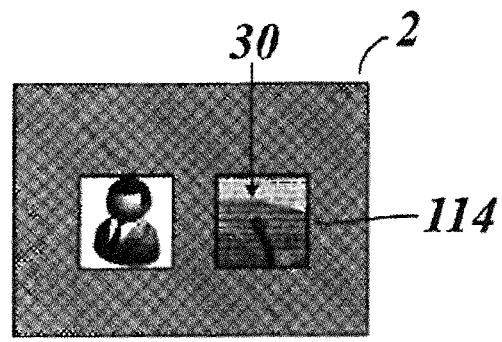
FIG. 13a shows a schematic top view of a security element in a first observation situation.
Figure 13B:
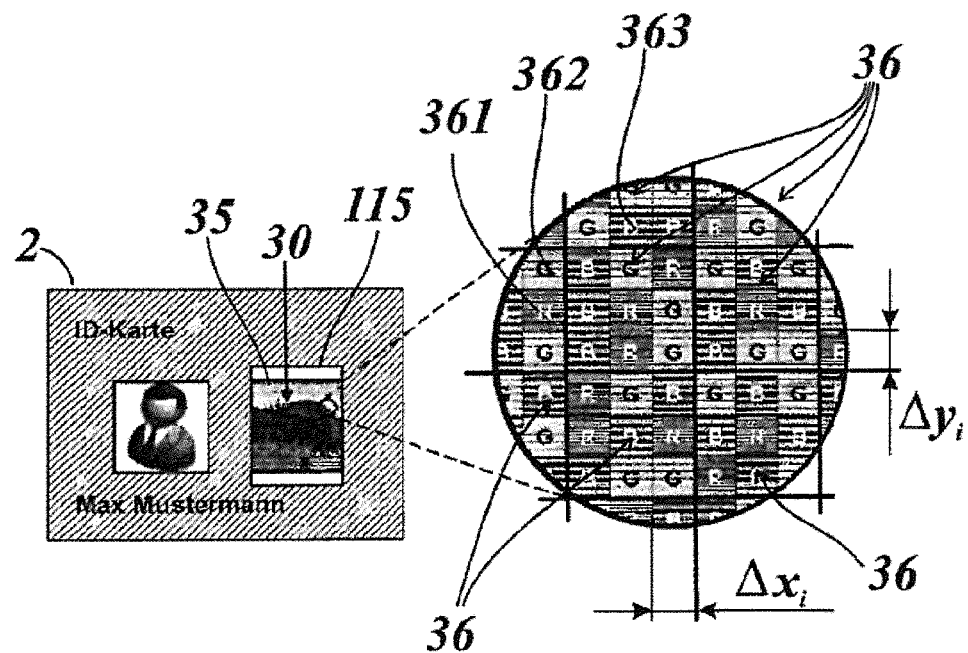
FIG. 13b shows a schematic top view of the security element according to FIG. 13a in a second observation situation.

In the embodiment example according to FIG. 13a and FIG. 13b a colored representation of a motif is generated at a particular tilt angle range, which colored representation is provided by color mixing of two or more base colors generated by the transmissive diffraction structures.

As indicated in FIG. 13b, in the area 30 of the security element 20 a motif area 35 is provided which is molded here for example in the form of a moose. This motif area is divided into a plurality of image point areas 36. In each of the image point areas 36 the color value and the brightness which this image point area is to have in order to form the motif, namely the moose, are now determined. In the image point areas 36 none or one, two or three different ones of the zones 361, 362 and 363 are now provided depending on these values. The zones 361 here are covered with a transmissive diffraction grating to generate a red color at the determined tilt angle range, the zones 362 are covered with a transmissive diffraction grating different from this in order to produce a green color at the determined tilt angle range and the zones 363 are covered with a transmissive diffraction grating different from this in order to generate a blue color at the determined tilt angle range. The dimension of the image point areas 36 here is chosen such that a color mixing of the different ones of the zones 361 to 363 arranged there in each case is brought about. The image point areas 36 thus preferably have a lateral dimension of less than 300 µm in at least one direction. The zones 361 to 363 likewise have, in at least one direction, a dimension of less than 300 µm, preferably less than 150 µm, further preferably less than 80 µm. Further, the width and/or length of the zones 361 to 363 is preferably chosen to be greater than 20 µm, 10 µm or 5 µm.

The color value is set to the correspondingly predetermined value by the ratio of the sizes of the surface area of the zones 361 to 363 in the respective image point area 36 and the brightness of the respective image point is set to the correspondingly predetermined value by the total size of the surface area of the zones 361 to 363 in the respective image point area 36.

The diffraction gratings arranged in the zones 361 to 363 are preferably formed like the diffraction grating 52, wherein the following structure parameters for the respective diffraction structure are preferably used here:

Diffraction grating of the zones 361 (red): grating period=770 nm; thickness of the HRI layer=120 nm; grating depth=570 nm; relief shape sinusoidal.

Diffraction grating of the zones 362 (green): grating period=650 nm; layer thickness of the HRI layer=120 nm; relief depth=450 nm; relief shape sinusoidal.

Diffraction grating of the zones 363 (blue): grating period=570 nm; thickness of the HRI layer=120 nm; relief depth=400 nm; relief shape sinusoidal.

However, it is also possible for the zones 361 to 363 to be formed according to one of the diffraction gratings 51, 54 or 55, or to be formed of different ones of the diffraction gratings 51 to 55. This is advantageous in particular when for example a different colored appearance of the motif is to be achieved at different tilt angles.

Two or more images can also be interlaced in each other. Here, the images are broken down into zones and then the individual zones of the images are arranged alternating such that the images are interlaced in each other. The zones here preferably have, in at least one direction, a lateral dimension of less than 300 µm, preferably of less than 150 µm, further preferably of less than 80 µm. This means that, in an area of surface which approximately corresponds to the size of an individual image or is only a little larger, both images are arranged simultaneously and, depending on the observation situation, are preferably visible individually there. The diffraction structures of the zones of the different images can differ for example in the azimuth angle. This means e.g. that two images with the same diffraction structures for the colors red, green and blue are interlaced in each other, wherein the diffraction structures of the second image are arranged rotated by, in each case, a particular azimuth angle compared with the diffraction structures of the first image, thus the two images become visible alternately when the security element is turned or tilted.

For the observer, when the security element 2 is observed perpendicularly, for example according to the observation situation according to FIG. 12b, the image shown in FIG. 13a appears, in which the area 3 appears transparent and the objects arranged behind the security element 2 are visible as item of information 114 through the area 30. When the security document is tilted, for example according to FIG. 12c, a colored representation of a moose then appears in the area 30 as item of information 115.

FIG. 14a to FIG. 18b show further embodiments in which, in the area 30 of the security element 2, a plurality of different zones covered with different diffraction structures are provided.

Figure 14A:
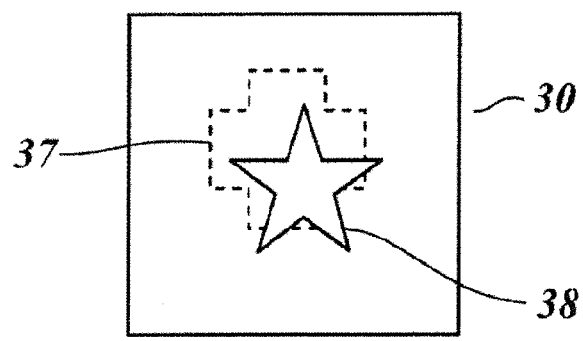
FIG. 14a shows a schematic top view of a transparent area of a security element.
Figure 14B:
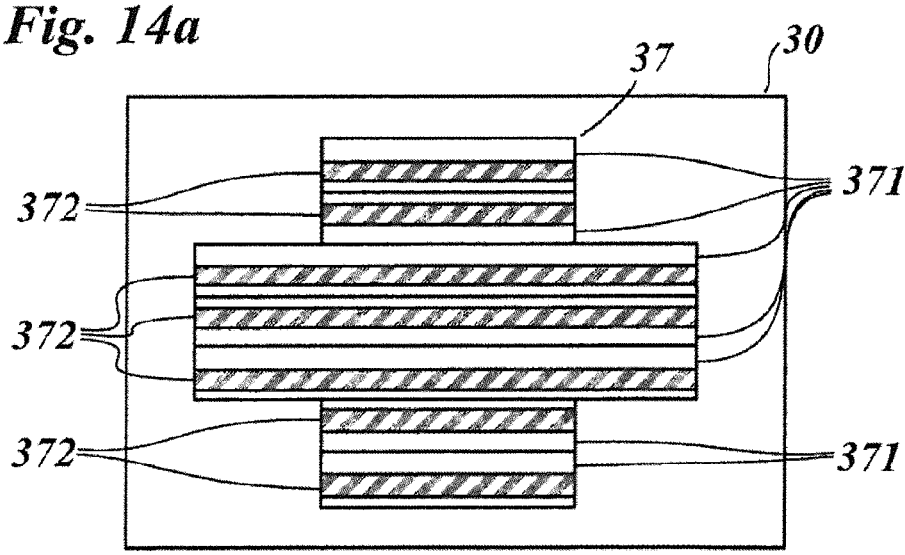

As shown in FIG. 14a, a first motif area 37 molded in the form of a motif, for example a cross, and a second motif area 38 molded in the form of a second motif, for example a star, are provided in the area 30. As shown, not to scale, in FIG. 14b for example with reference to motif area 37, each motif area 37 and 38 is divided into a plurality of partial areas 371 and 381 respectively, which in each case are covered with one or more zones 372 and 382 respectively. The zones 372 and 382 here in each case have at least one lateral dimension of less than 300 µm, preferably less than 150 µm, further preferably less than 80 µm. The zones 372 and 382 here can have a striped shaping, in particular stripes running in a straight line or stripes running in waves or zigzags, as shown in FIG. 14b and FIG. 14c, or can also have a shaping in the form of pixels, for example a shaping in the form of circular disks or rectangles or other polygons, in particular a triangular, pentagonal or polygonal shaping.

Figure 14C:
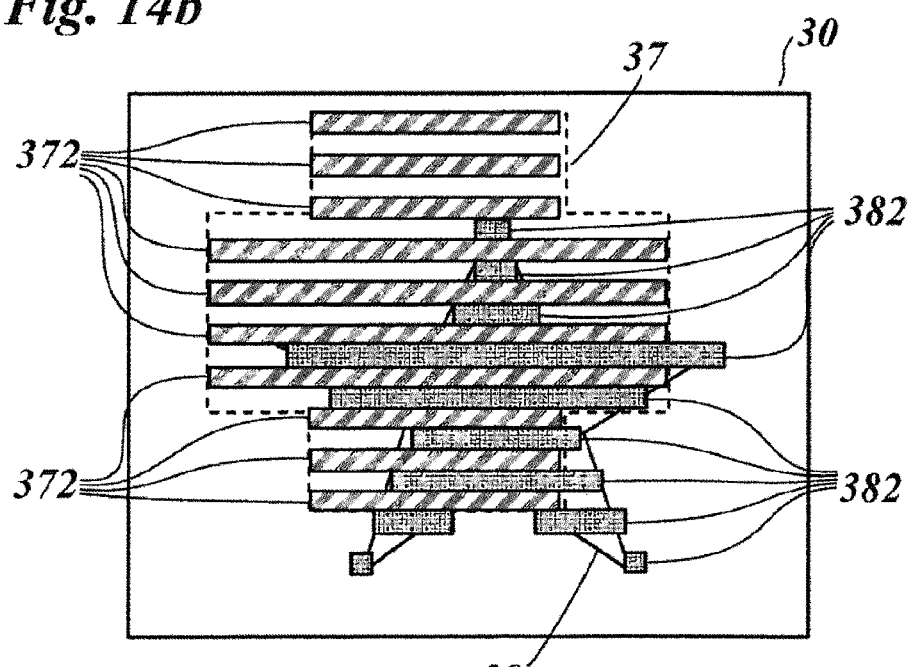

In the overlap area of the motif areas 37 and 38 the zones 372 and 382, as shown in FIG. 14c, are arranged gridded in each other. The zones 372 and 382 are thus preferably arranged according to a preferably regular 1- or 2-dimensional grid, wherein areas for zones 371 and areas for zones 382 are provided alternating. The areas of the grid covered by the respective motif area which are assigned to the zones of this motif area are then covered with the corresponding zones, as also indicated in FIG. 14c.

The zones 371 and 372 in each case are covered with different transmissive diffraction structures which in each case are formed according to one of the diffraction structures 51 to 55. In this respect reference is thus made to the previous statements.

Figure 15A:
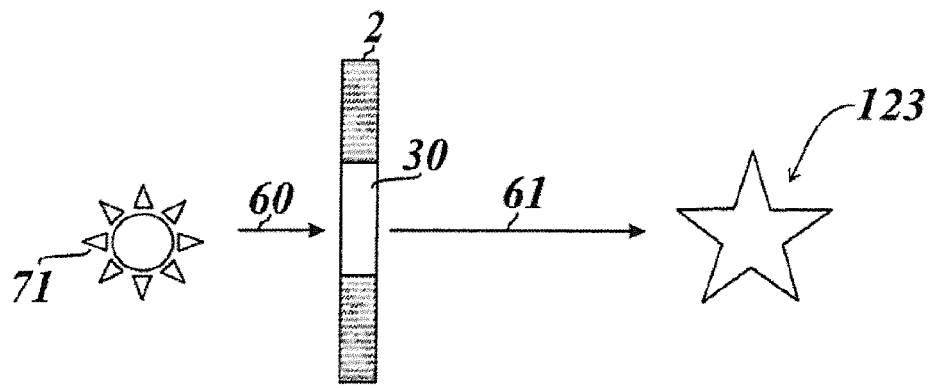
FIG. 15a to FIG. 15c show schematic representations to illustrate the optical effect of the security element according to FIG. 14a in different observation situations.
Figure 15B:
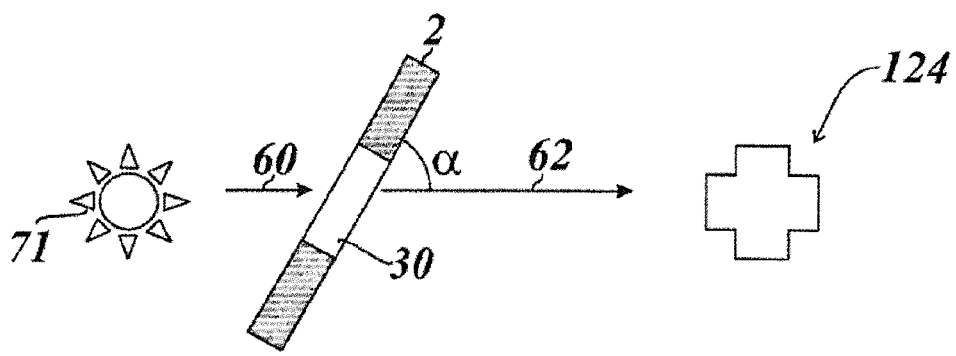
Figure 15C:
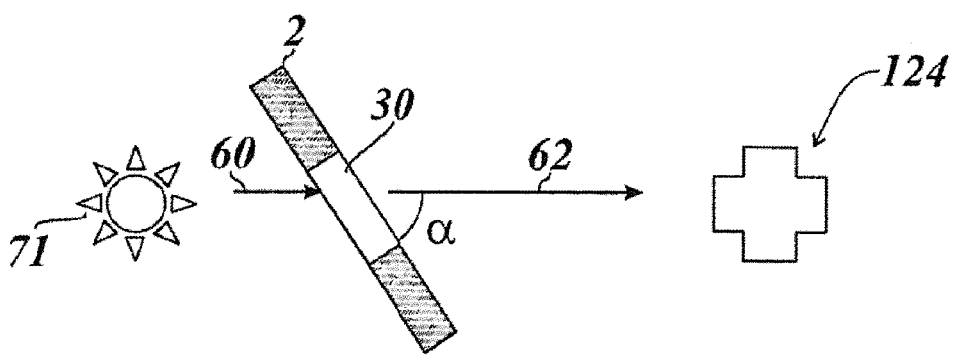

Depending on the choice of these diffraction structures, by means of such an arrangement, for example, the optical effects described in the following can thus be implemented:

In the embodiment example according to FIG. 15a to FIG. 15c the diffraction structure of the zones 382 is chosen such that it changes the color spectrum when the security element 2 is arranged perpendicularly relative to the axis of view, with the result that the incident light 60 is transmitted through the area 30 changed in its spectrum as light 61. The diffraction structures with which the zones 372 are covered are color-neutral when the security element 2 is arranged perpendicularly relative to the axis of view, but the spectrum of the transmitted light changes when the security element 2 is tilted by an angle α, with the result that a light 62 changed in color spectrum is visible to the observer. Thus, when observed in transmitted light with a perpendicular positioning of the security element 2 according to FIG. 15a, in the area 30 an image 123 of a blue star appears to the observer and, when tilted according to FIG. 15b and FIG. 15c, an image 124 of a red cross appears.

For this, for the diffraction structure which covers the zones 372 a diffraction structure corresponding to the diffraction structures 51 to 53 is preferably used, and for the diffraction structure which covers the zones 382 a diffraction structure corresponding to the diffraction structures 54 and 55 is used.

Figure 16A:
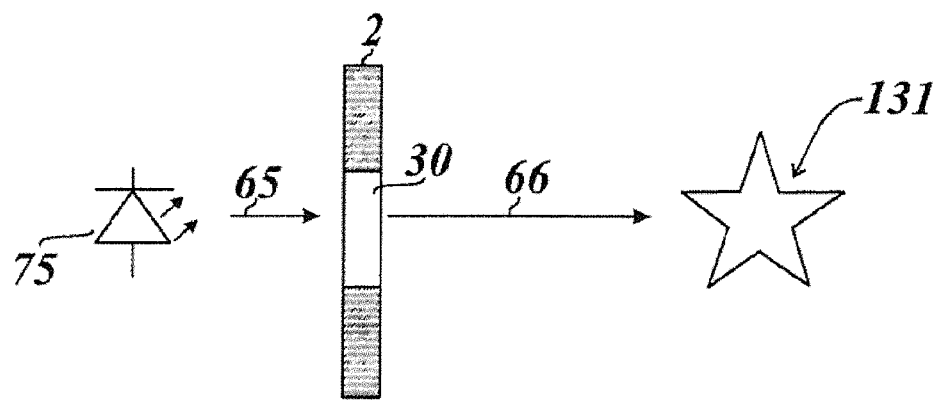
FIG. 16a and FIG. 16b show schematic representations of observation situations of a security element.
Figure 16B:
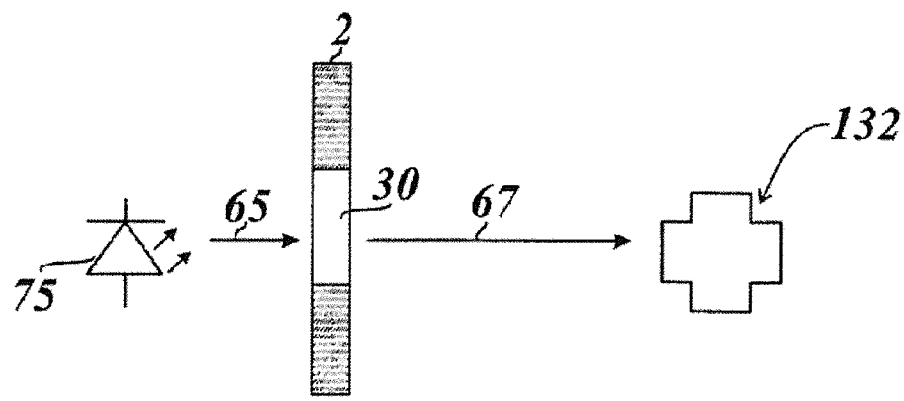

A further embodiment example is shown in FIG. 16a and FIG. 16b. Here, in the observation situation according to FIGS. 16a and 16b the security element 2 is illuminated with differently colored, in particular monochromatic light 65, e.g. from an LED. The light source 75 thus emits for example, as light 65, red light onto the area 30 of the security element 2 and the light source 76 emits blue light as light 65 onto the area 30 of the security element 2, which then strikes the eye of the observer as light 66 or 67 respectively. When observed in transmitted light, for the observer here an image 132 of a red star appears in the observation situation according to FIG. 16a, and an image 132 of a blue cross appears in the observation situation according to FIG. 16b. For this, the zones 372 and 382 are preferably covered with different diffraction structures which are formed according to the diffraction structure 53 and differ correspondingly in their grating period.

Figure 17A:
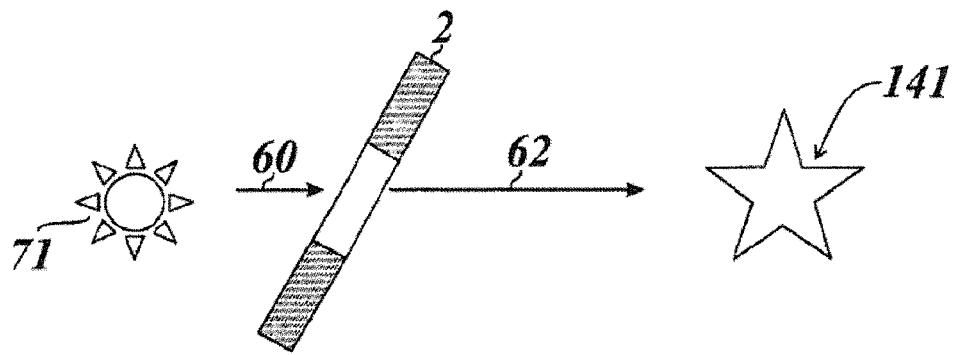
FIG. 17a to FIG. 17c show schematic representations of observation situations of a security element.
Figure 17B:
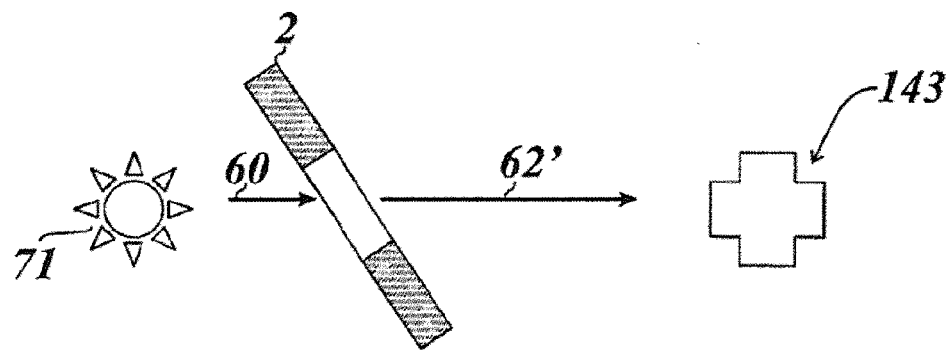
Figure 17C:
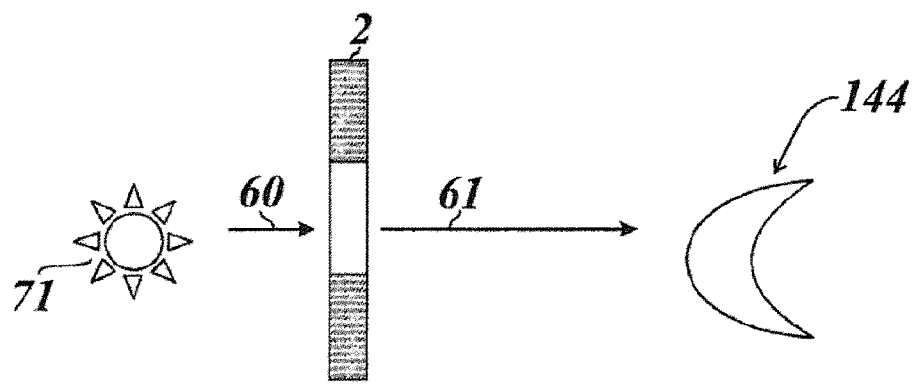

In the embodiment example according to FIG. 17a to FIG. 17c, in addition to the motif area 37 and 38 molded in the form of a star and a cross, a motif area molded in the form of a crescent is further additionally provided. Depending on the tilt angle, as shown in FIG. 17a and FIG. 17b, when the security element 2 is tilted relative to the perpendicular to the axis of view, either an image 141 of a blue star or an image 143 of a green cross appears here and, when the security element 2 is positioned perpendicularly to the axis of view, an image 144 of a red crescent appears, i.e. the light 60 is rotated into the light 61, 62 and 62' respectively. For this, the zones 372 and 382 are covered with asymmetrical relief structures which are preferably arranged mirror-symmetrical to each other. The zones assigned to the crescent motif here preferably have a symmetrical relief shape. These zones are preferably covered with a diffraction structure formed according to the diffraction structures 54 and 55. The zones 372 and 382 are preferably covered with diffraction structures formed according to the diffraction structures 51 to 52.

Further, it is advantageous to use, for the zones 372 and 382, specific diffraction structures formed according to the diffraction structures 54 and 55 which—as described above—influence almost the whole spectrum of the light, with the result that, for example, a bright star or a bright cross appears in the observation situations according to FIG. 17a and FIG. 17b.

Figure 18A:
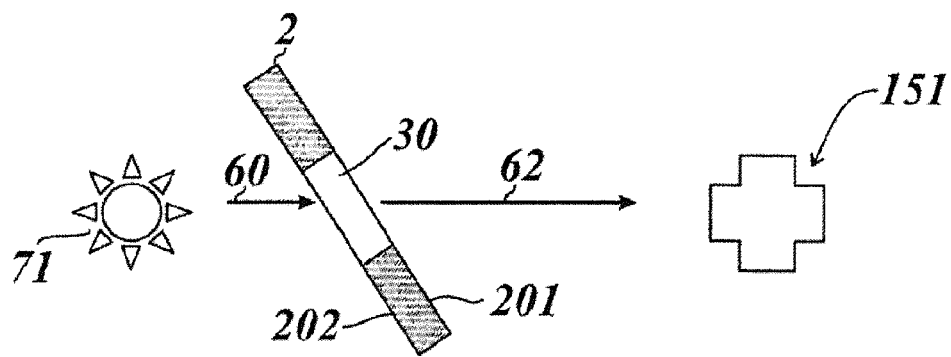
FIG. 18a and FIG. 18b show schematic representations of observation situations of a security element.
Figure 18B:
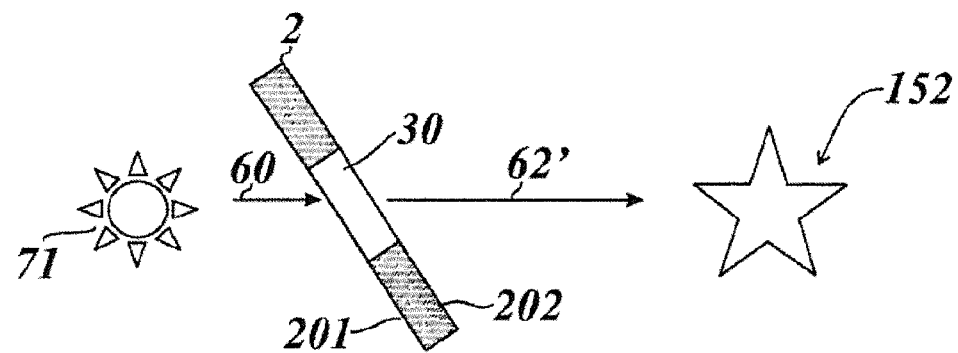

A further interesting effect which arises when diffraction structures with asymmetrical relief shape are used according to FIG. 17a and FIG. 17b is shown in FIG. 18a and FIG. 18b. Thus the representation according to FIG. 18a corresponds to the representation according to FIG. 17b, i.e. an image 151 of a green cross appears to the observer in the area 30 when observed according to this observation situation in transmitted light. If the security element 2 is now rotated by 180°, preferably in the same tilt plane, i.e. the side 202 no longer faces the light source 71 and the side 201 the observer, but rather the side 201 faces the light source 701 and the side 202 the observer, a blue star appears in the same observation situation. This effect can be utilized as an additional security feature.

Further interesting additional effects appear when the zones 372 and 383 respectively are covered with diffraction structures which are formed according to the diffraction structure 53. It is possible here for example for a different item of information to appear to the observer in transmitted light in the area 30, depending on the alignment of a polarizer 70 arranged between light source 71 and observer.

Figure 19A:
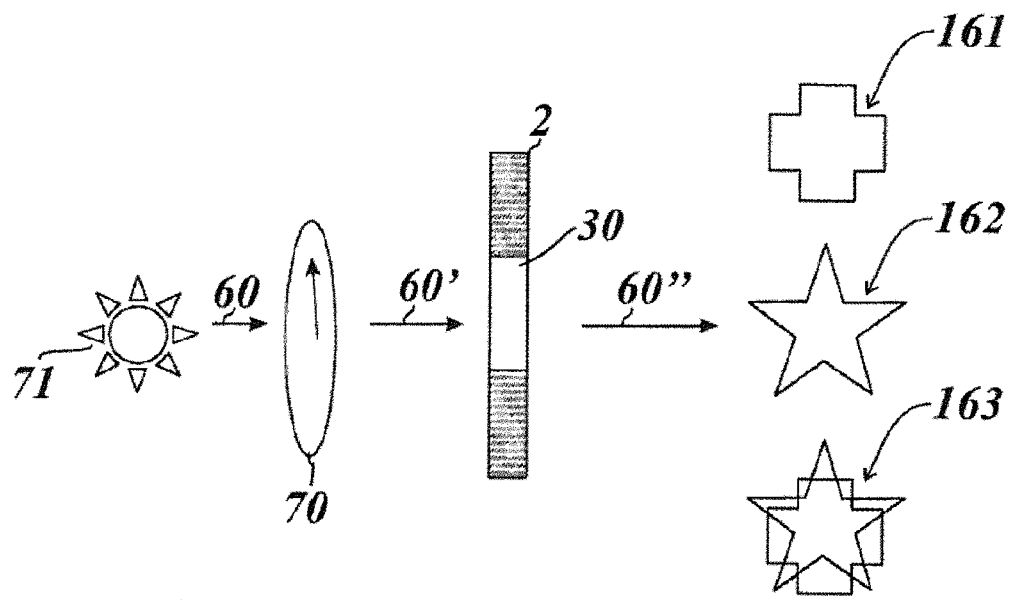
FIG. 19a to FIG. 19d show schematic representations of observation situations of a security element.

In the embodiment according to FIG. 19a the light 60 from the light source 71 thus transmits through the polarizer 70, is changed into the light 60', and strikes the eye of the observer as light 60".

Thus, as illustrated in FIG. 19a, depending on the alignment of the polarization axis of a polarizer 70 relative to the security element 2, for the observer, for example, an image 161 of a green cross, an image 162 of a red star or an image 163 of a superimposed arrangement of these two elements appears. To achieve this effect, in particular the azimuth angles of the diffraction structures arranged in the zones 372 on the one hand and 382 on the other hand differ here, in particular by 90°. If the polarizer 70 is not introduced into the beam path, the image 163 arises in the area 30 in the observation situation according to FIG. 19a.

Figure 19B:
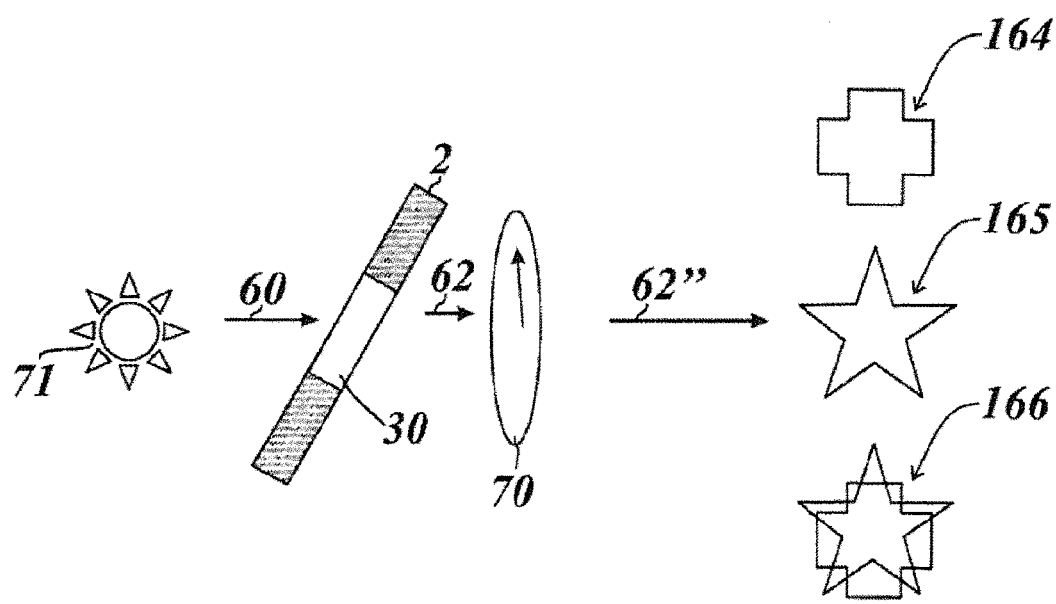

In the embodiment according to FIG. 19b the light 60 of the light source 71 is changed in the area 30 into the light 62, which is changed into the light 62" by the polarizer 70.

In the embodiment according to FIG. 19b an effect corresponding to FIG. 19a arises when the security element 2 is observed in an arrangement of the security element 2 tilted relative to the perpendicular, i.e. for example images 164, 165 and 166 respectively of a blue cross, a red star or a mixed motif, which also appears in an observation without polarizer at this tilt angle, also appear there depending on the alignment of the polarizer. Here too, the diffraction gratings of the zones 372 and 382 differ in particular in that their azimuth angles differ by 90°.

Figure 19C:
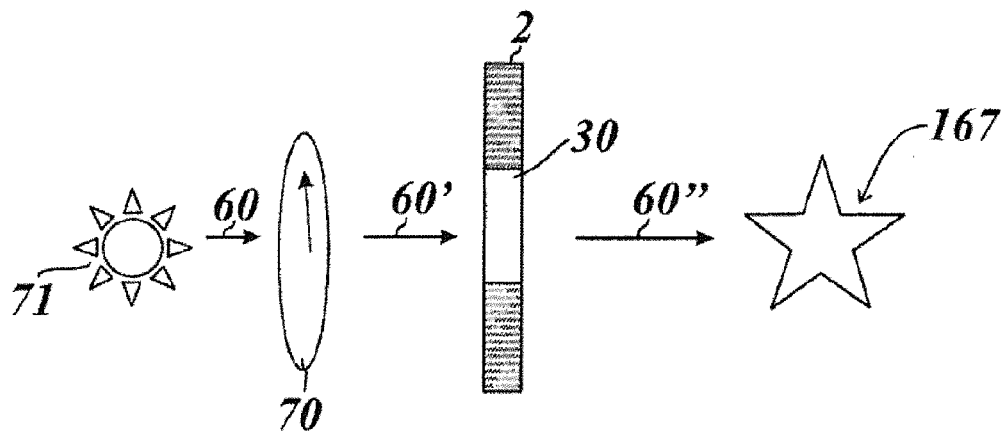
Figure 19D:
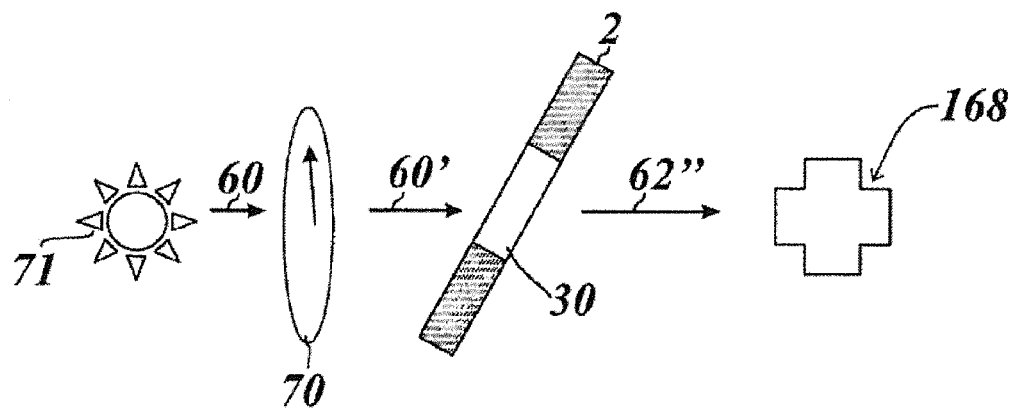

In the embodiment example according to FIG. 19c and FIG. 19d, in the zones 272 and 282 diffraction structures are provided which are formed, on the one hand, according to the diffraction structures according to FIG. 19a and, on the other hand, according to the diffraction structures according to FIG. 19b. When the polarizer 70 is used, as shown in FIG. 19c, with a perpendicular arrangement of the security element 2, in the area 30 for example an image 176 of a red star thus appears, when the polarizer 70 is introduced into the beam path and with a tilted arrangement for example an image 168 of a green cross, as represented in FIG. 19d. When the polarizer 70 is rotated, the star or the cross then disappears, which serves as an additional security feature.

Figure 20:
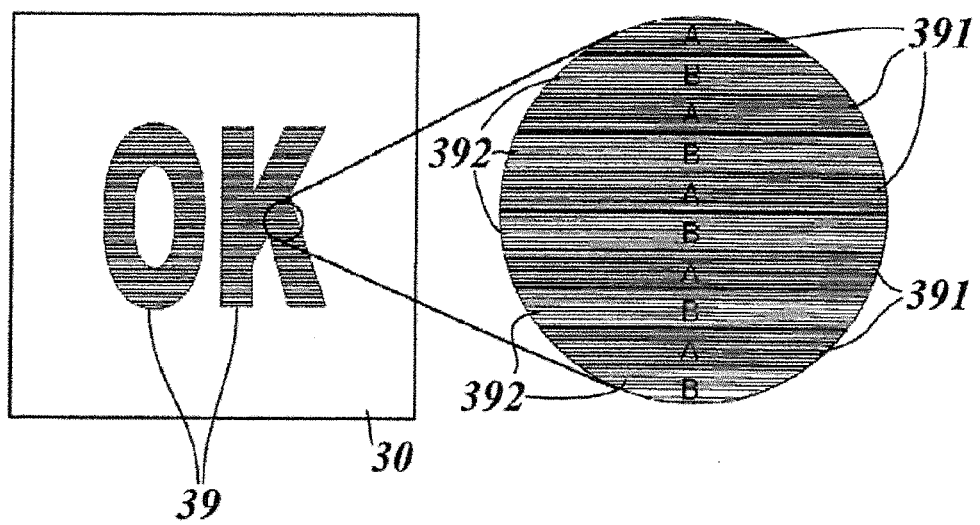
FIG. 20 shows a schematic top view of an area of a security element.

FIG. 20 shows a further embodiment example.

FIG. 20 shows the area 30 of a security element 2 with a motif area 39 molded in the form of the motif "OK". The motif area 39 has a plurality of partial areas 391 and partial areas 392. The partial areas 391 are covered with a transmissive diffraction structure which is formed according to the diffraction structures 51 to 55. The partial areas 392 are covered with a usual reflective diffraction structure. The partial areas 391 and 392 in each case have at least one lateral dimension of less than 300 μm, in particular less than 150 μm, preferably of less than 80 μm. The partial areas 391 and 392 here can be formed, firstly, in the form of stripes, as shown in FIG. 20, but also in the form of pixels. Further, the partial areas 391 and 392, as shown in FIG. 20, are preferably arranged alternately next to each other. In the motif area 39, when observed in transmitted light, an optical security feature is thus generated, as has already been explained for example with reference to the previous figures FIG. 1 to FIG. 19d. When the area 30 is observed in reflected light, a further item of information only visible when observed in reflected light, which is generated by the reflective diffraction structures with which the areas 392 are covered, further appears to the observer.

Figure 21:
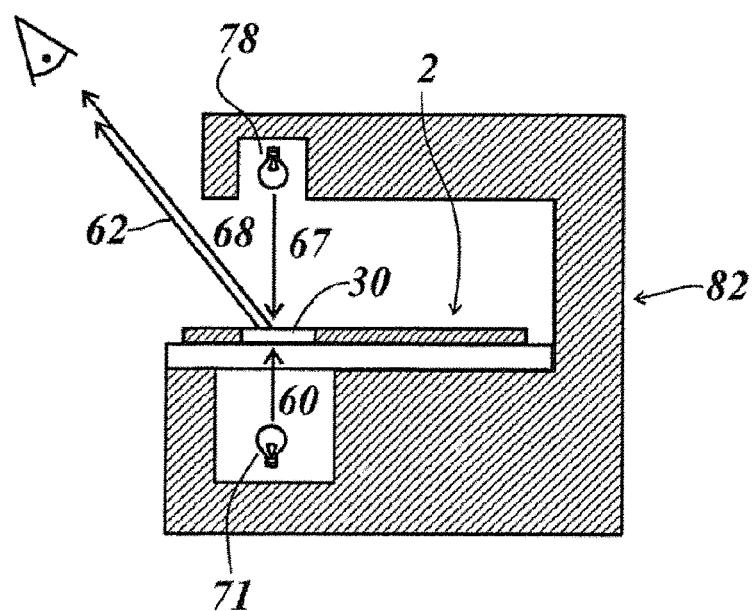
FIG. 21 shows a schematic sectional representation of a device for inspecting the security element according to FIG. 20.

A corresponding arrangement for inspecting the thus-provided security feature is explained by way of example with reference to FIG. 21. FIG. 21 shows a device 20 for inspecting a security element 2. The device 82 has two light sources 71 and 78 which are positioned on opposite sides of the security element 2. The light emitted by the light source 71 is changed by the transmissive diffraction structures of the partial areas 391 in its spectrum and transmitted to the observer as light 62. The light 67 of the light source 78 is diffracted by the reflective diffraction structures which are arranged in the partial areas 391, and a light 68 is reflected to the observer. A superimposed arrangement of the items of information generated by the transmissive diffraction structures and by the reflective diffraction structures thus appears to the observer. An inspection of the effect can further be carried out by switching the light source 71 and 78 on and off.

The invention claimed is:

1. A security element comprising a multi-layer film body, with a first area that is transparent in transmitted light,
    wherein the security element has a substrate which has, in the first area, one or more transmissive diffraction structures which display one or more optical security features when observed in transmitted light, and
    wherein, in the first area, two or more different transmissive diffraction structures are arranged which, when observed in transmitted light against a light source radiating white light, display different color-change effects when the security element is tilted and/or turned, and
    wherein, when a first side of the security element facing an observer is observed in transmitted light, against a light source which radiates white light parallel to a beam axis and is arranged on a second side of the security element opposite the first side of the security element, at least one of the one or more transmissive diffraction structures brings about a change in a color of a partial area of the first area which is covered with the one or more transmissive diffraction structures when the security element is tilted relative to the beam axis, wherein the partial area is patterned in the form of a motif, and
    wherein the at least one transmissive diffraction structure comprises a relief structure formed in the first area, the relief structure having a relief depth of between 400 nm and 1700 nm and a grating period of between 500 nm and 1500 nm such that light incident on the second side of the security element in a beam direction perpendicular to a plane spanned by the second side of the security element is transmitted in the direction of the beam direction through the substrate largely unchanged in its color spectrum, wherein a change of the spectrum in the range of from 460 nm to 660 nm is less than 15%.

2. A security element according to claim 1, wherein the one or more transmissive diffraction structures are designed such that, when observed in transmitted light against a light source radiating white light directionally, partial areas of the first area that are covered with the one or more transmissive diffraction structures display, as an optical security feature, a color-change effect that is recognizable to a human observer, when the security element is tilted.

3. A security element according to claim 1, wherein a transmissivity of the at least one transmissive diffraction structure and/or of the security element in the beam direction is greater than 70%.

4. A security element according to claim 1, wherein the at least one transmissive diffraction structure transmits light incident on the second side in a beam direction with an angular offset of from 20° to 50° relative to a surface normal of a plane spanned by the second side of the security element changed in its color spectrum in a direction perpendicular to the surface normal of the plane spanned by the second side of the security element or in the beam direction.

5. A security element according to claim 1, wherein the first area has one or more first zones which are covered with a first of the transmissive diffraction structures, and has one or more second zones which are covered with a second of the transmissive diffraction structures, wherein the first transmissive diffraction structure differs from the second transmissive diffraction structure.

6. A security element according to claim 5, wherein the first and second transmissive diffraction structures differ in their relief depth, their azimuth angle and/or their grating period.

7. A security element according to claim 5, wherein the first and second transmissive diffraction structures are formed of different types of transmissive diffraction structures.

8. A security element according to claim 5, wherein neighboring first and second zones are spaced apart from each other by less than 10 μm.

9. A security element according to claim 5, wherein each of the first and second zones has a lateral dimension of more than 300 μm.

10. A security element according to claim 9, wherein the one or more first and second zones are molded to form a motif, wherein the first zones form a foreground area of the motif and the second zones form a background area of the motif, or wherein the one or more first zones are molded to form a first motif and the one or more second zones are molded to form a second motif.

11. A security element according to claim 5, wherein, in the first area a plurality of first zones and second zones are provided, and wherein each of the first and second zones has at least one lateral dimension of less than 300 μm.

12. A security element according to claim 5, wherein, in the first area, a plurality of third zones which are covered with a third one of the transmissive diffraction structures, and/or fourth zones which are covered with a fourth one of the transmissive diffraction structures are provided, wherein each of the first, second, third and fourth transmissive diffraction structures mutually differ from each other and each of the third and fourth zones respectively has at least one lateral dimension of less than 300 μm.

13. A security element according to claim 11, wherein the first area has a motif area which is divided into a plurality of image point areas, wherein, in at least a first of the image point areas at least two different zones selected from the group first and second zones, the group first, second and third zones or the group first, second, third and fourth zones are arranged and wherein a color appearing in the first image point area when observed in transmitted light at least at one tilt angle is generated by additive color mixing of colors generated at this tilt angle by those of the transmissive diffraction structures arranged in this image point area in the different zones.

14. A security element according to claim 13, wherein at least 10% of the image point areas are formed as first image point areas.

15. A security element according to claim 11, wherein a first motif area molded in the form of a first motif and a second motif area molded in the form of a second motif are provided in the first area, wherein the first motif area is divided into a plurality of partial areas, wherein each of the partial areas are covered with one or more first zones, and the second motif area is divided into a plurality of partial areas, wherein each of the partial areas are covered with one or more second zones.

16. A security element according to claim 15, wherein each of the first and second zones is arranged according to a 1- or 2-dimensional grid and the first and second zones are gridded into each other in the overlap area.

17. A security element according to claim 1, wherein the substrate has, in the first area, one or more reflective diffraction structures which display one or more optical security features when observed in reflected light.

18. A security element according to claim 1, wherein one or more of the one or more transmissive diffraction structures are formed of a relief structure molded in a surface of the substrate, which are molded in the surface of the first side of the security element.

19. A security element according to claim 1, wherein one or more of the one or more transmissive diffraction structures are formed of a relief structure molded between two transparent layers of the substrate, wherein a refractive index of these layers differs by at least 0.1.

20. A security element according to claim 19, wherein one of the two transparent layers is a replication layer and the other of the two transparent layers is a porous layer having pores, wherein the pores of the porous layer are filled with air.

21. A security element according to claim 20, wherein the porous layer has a layer thickness between 2 and 50 μm.

22. A security element according to claim 19, wherein one of the two transparent layers is a replication layer and the other of the two transparent layers is an HRI layer, which has a layer thickness between 50 and 300 nm.

23. A security element according to claim 19, wherein the relief structure has a relief depth more than 200 nm and the relief depth of the relief structure is smaller than 1200 nm.

24. A security element according to claim 19, wherein the relief structure is a grating defined by the parameters relief shape, relief depth, grating period and azimuth angle and the relief depth is between 990 and 1700 nm, and the grating period is between 500 nm and 1500 nm.

25. A security element according to claim 19, wherein the relief structure has an asymmetrical relief shape.

26. A security element according to claim 19, wherein light transmitted perpendicularly through the relief structure in a zero order in a wavelength range of from 460 nm to 660 nm is largely not changed in its color spectrum and a transmittance of the light transmitted in the zero order is greater than 30%.

27. A security element according to claim 1, wherein one or more of the one or more transmissive diffraction structures is formed of a plurality of elements, wherein each of the elements has at least one element surface arranged substantially parallel to a base plane, the elements are arranged offset relative to each other in relation to at least one first direction running parallel to the base plane and elements neighboring the element surfaces are spaced apart in a direction perpendicular to the base plane according to a variation function dependent on the at least one first direction, by a first distance or a multiple of the first distance, wherein the variation function is a periodic function and in each period of the variation function the element surfaces of at least two elements following on from each other in the at least one first direction are spaced apart from each other by the first distance.

28. A security element according to claim 27, wherein the period is greater than 3 μm, wherein each period comprises 3 to 10 successive elements, and wherein the first distance is between 50 and 1000 nm.

29. A security element according to claim 27, wherein the substrate has a transparent layer in which the elements are embedded and the elements are formed of a material which differs from the material of the transparent layer and differs in its refractive index by more than 0.1.

30. A security element according to claim 27, wherein the elements are formed of partial areas of a layer of the substrate and the element surfaces form at least one partial area of a surface of this layer and define a surface relief molded in this layer.

31. A security element according to claim 18, wherein the relief structure is a zero-order diffraction grating defined by the parameters relief shape, relief depth, grating period and azimuth angle, the relief depth is between 300 nm and 500 nm, and the grating period is between 250 and 700 nm.

32. A security element according to claim 1, wherein the security element has one or more opaque second areas.

33. A security element according to claim 1, wherein the security element is a laminating film, a transfer layer of a transfer film, a security thread or a multi-layer body in card form.

34. A security document with a security element according to claim 1.

35. A security element comprising a multi-layer film body, with a first area that is transparent in transmitted light,
wherein the security element has a substrate which has, in the first area, one or more transmissive diffraction structures which display one or more optical security features when observed in transmitted light, and
wherein the substrate has, in the first area, one or more reflective diffraction structures which display one or more optical security features when observed in reflected light, and
wherein a plurality of first partial areas which are covered with one of the one or more transmissive diffraction structures and a plurality of second partial areas which are covered with one of the one or more reflective diffraction structures are provided in the first area, wherein each of the first and second partial areas has at least one lateral dimension of less than 300 μm, and wherein, at least in areas, first and second partial areas are assigned next to each other, such that, in the first area, a first item of optical information determined by the first partial areas appears in transmitted light and a second item of optical information determined by the second partial areas appears in reflected light, and
wherein at least one transmissive diffraction structure comprises a relief structure formed in the first area, the relief structure having a relief depth of between 400 nm and 1700 nm and a grating period of between 500 nm and 1500 nm such that light incident on the second side of the security element in a beam direction perpendicular to a plane spanned by the second side of the security element is transmitted in the direction of the beam direction through the substrate largely unchanged in its color spectrum, wherein a change of the spectrum in the range of from 460 nm to 660 nm is less than 15%.

36. A security element comprising a multi-layer film body, with a first area that is transparent in transmitted light,
wherein the security element has a substrate which has, in the first area, one or more transmissive diffraction structures which display one or more optical security features when observed in transmitted light, and
wherein one or more of the one or more transmissive diffraction structures are formed of a relief structure molded in a surface of the substrate between a transparent layer and an HRI layer, and
wherein the relief structure is a zero-order diffraction grating defined by the parameters relief shape, relief depth, grating period and azimuth angle, the relief depth is between 300 nm and 500 nm, and the grating period is between 250 and 700 nm such that light incident on the second side of the security element in a beam direction perpendicular to a plane spanned by the second side of the security element is transmitted in the direction of the beam direction through the substrate largely unchanged in its color spectrum, wherein a change of the spectrum in the range of from 460 nm to 660 nm is less than 15%, and
wherein the HRI layer has a thickness between 70 and 250 nm.

* * * * *